United States Patent
Dai et al.

(10) Patent No.: US 10,834,638 B2
(45) Date of Patent: Nov. 10, 2020

(54) DATA TRANSMISSION METHOD, WIRELESS NETWORK NODE, AND COMMUNICATIONS SYSTEM

(71) Applicant: HUAWEI TECHNOLOGIES CO., LTD., Guangdong (CN)

(72) Inventors: Mingzeng Dai, Shanghai (CN); Jian Zhang, Shanghai (CN); Jing Liu, Shanghai (CN); Qinghai Zeng, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 15/856,438

(22) Filed: Dec. 28, 2017

(65) Prior Publication Data

US 2018/0124647 A1 May 3, 2018

Related U.S. Application Data

(63) Continuation of application No. PCT/CN2016/087388, filed on Jun. 28, 2016.

(30) Foreign Application Priority Data

Jun. 30, 2015 (CN) .......................... 2015 1 0374525

(51) Int. Cl.
*H04W 28/18* (2009.01)
*H04W 72/04* (2009.01)
(Continued)

(52) U.S. Cl.
CPC ........... *H04W 28/18* (2013.01); *H04W 28/06* (2013.01); *H04W 72/0406* (2013.01);
(Continued)

(58) Field of Classification Search
CPC ..... H04W 28/06; H04W 28/18; H04W 80/02; H04W 72/0406; H04W 80/00;
(Continued)

(56) References Cited

U.S. PATENT DOCUMENTS 8,743,905 B2 6/2014 Ray et al.
2005/0266846 A1 12/2005 Kim et al.
(Continued)

FOREIGN PATENT DOCUMENTS

CN 103582054 A 2/2014
CN 103702422 A 4/2014
(Continued)

OTHER PUBLICATIONS

Extended European Search Report issued in European Application No. 16817227.8 dated May 24, 2018, 8 pages.
(Continued)

*Primary Examiner* — Hoang-Chuong Q Vu
(74) *Attorney, Agent, or Firm* — Fish & Richardson P.C.

(57) ABSTRACT

A data transmission method, including: learning, by a first wireless network node, a bearer type of a downlink packet; and when the bearer type is a signaling radio bearer SRB, sending, by the first wireless network node, the downlink packet to a second wireless network node, so that the second wireless network node performs a function of a Packet Data Convergence Protocol (PDCP) layer on the downlink packet; or when the bearer type is a data radio bearer DRB, performing, by the first wireless network node, a function of a PDCP layer on the downlink packet, and sending the processed downlink packet to the second wireless network node.

8 Claims, 14 Drawing Sheets

(51) Int. Cl.
*H04W 28/06* (2009.01)
*H04W 72/08* (2009.01)
*H04W 36/30* (2009.01)
*H04W 76/10* (2018.01)
*H04W 36/00* (2009.01)
*H04W 80/02* (2009.01)

(52) U.S. Cl.
CPC ........ *H04W 72/08* (2013.01); *H04W 36/0033* (2013.01); *H04W 36/30* (2013.01); *H04W 76/10* (2018.02); *H04W 80/02* (2013.01)

(58) Field of Classification Search
CPC ... H04W 88/06; H04W 84/045; H04W 76/27; H04W 36/0027; H04W 88/10; H04L 29/12839; H04L 69/32
See application file for complete search history.

(56) References Cited

U.S. PATENT DOCUMENTS

| | | | | |
|---|---|---|---|---|
| 2012/0182929 | A1* | 7/2012 | Chen | H04L 63/1458 370/315 |
| 2014/0082697 | A1* | 3/2014 | Watfa | H04L 63/0485 726/3 |
| 2014/0334417 | A1 | 11/2014 | Aminaka et al. | |
| 2015/0003435 | A1* | 1/2015 | Horn | H04L 5/0058 370/338 |
| 2015/0043435 | A1 | 2/2015 | Blankenship et al. | |
| 2015/0215826 | A1* | 7/2015 | Yamada | H04W 36/0072 455/436 |
| 2015/0350953 | A1* | 12/2015 | Himayat | H04W 40/02 370/235 |
| 2016/0338038 | A1* | 11/2016 | Zhang | H04W 72/0406 |
| 2016/0360441 | A1* | 12/2016 | Shi | H04W 28/04 |
| 2017/0048913 | A1* | 2/2017 | Teyeb | H04W 48/18 |
| 2017/0367141 | A1* | 12/2017 | Nagasaka | H04W 76/16 |
| 2017/0374579 | A1* | 12/2017 | Wang | H04W 28/08 |
| 2018/0027524 | A1* | 1/2018 | Zhang | H04L 5/0053 455/453 |
| 2018/0035483 | A1* | 2/2018 | Nagasaka | H04W 16/32 |
| 2018/0092118 | A1* | 3/2018 | Kim | H04W 28/0278 |
| 2018/0376386 | A1* | 12/2018 | Yi | H04W 36/0072 |

FOREIGN PATENT DOCUMENTS

| | | |
|---|---|---|
| CN | 103987124 A | 8/2014 |
| EP | 2688328 A1 | 1/2014 |
| WO | 2013076901 A1 | 5/2013 |
| WO | 2013179160 A2 | 12/2013 |
| WO | 2014130713 A1 | 8/2014 |

OTHER PUBLICATIONS

International Search Report and Written Opinion in International Application No. PCT/CN2016/087388, dated Sep. 19, 2016, 20 pages.

Japanese Office Action issued in Japanese Application No. 2017-566086 dated Jan. 22, 2019, 8 pages.

Office Action issued in Japanese Application No. 2019-12668 dated Sep. 1, 2020, 5 pages. (with English translation).

* cited by examiner

DATA TRANSMISSION METHOD, WIRELESS NETWORK NODE, AND COMMUNICATIONS SYSTEM

CROSS-REFERENCE TO RELATED APPLICATIONS

This application is a continuation of International Application No. PCT/CN2016/087388, filed on Jun. 28, 2016, which claims priority to Chinese Patent Application No. 201510374525.6, filed on Jun. 30, 2015. The disclosures of the aforementioned applications are hereby incorporated by reference in their entireties.

TECHNICAL FIELD

The present invention relates to the communications field, and in particular, to a data transmission method, a wireless network node, and a communications system.

BACKGROUND

As services are growing exponentially, mobile networks are evolving towards 5G mobile networks. A 5G network needs to provide a larger bandwidth, higher spectrum efficiency, and the like to support explosive growth of services. A higher amount of data can be effectively provided by using ultra dense low power small cell networks. However, dense network deployment results in more interference between cells and more complex interference scenarios. To resolve the foregoing problem, a centralized processing solution: C-RAN is provided. This solution can effectively resolve an interference problem and load balancing between small cells, thereby effectively increasing a system capacity. A C-RAN system includes an RRU (remote radio unit, RRU for short) and a BBU pool. The BBU pool includes multiple BBUs (baseband unit, BBU for short). The RRU is connected to the BBU pool by using a CPRI (common public radio interface, CPRI for short).

A current C-RAN solution can effectively increase a system capacity. However, an ideal transport network is required between an RRU and a BBU pool, that is, a CPRI requires an ideal bandwidth and an ideal delay. For example, for a cell that has a bandwidth of 20 MHz and that supports eight antennas, when a baseband bandwidth is 20 MHz, if a baseband sampling rate is 30.72 M, and a sampling bit width is 15 bits, a line rate of an antenna is 30.72*15*2 (I/Q)*16/15 (a 1-bit control word per 15-bit data)=983.04 M, and after 8B/10B encoding, a transmission rate on the CPRI is 983.04 M*10/8=1228.8 M. That is, when MIMO (Multiple-Input Multiple-Output, multiple-input multiple-output, MIMO for short) is not used, a single antenna in a single sector requires a transmission rate of 1228.8 M on the CPRI. If there are eight antennas, 1228.8 M needs to be multiplied by 8, that is, a transmission rate of 10 Gbit/s. It is difficult to achieve such a high transmission rate between the RRU and the BBU pool. Therefore, a solution that can lower requirements for a transmission bandwidth and a delay is urgently needed.

SUMMARY

An objective of embodiments of the present invention is to provide a data transmission method, a wireless network node, and a communications system, so as to resolve a problem of high requirements for a transmission bandwidth and a delay in the prior art.

To resolve the foregoing technical problem, a first aspect of the embodiments of the present invention provides a data transmission method, including:

learning, by a first wireless network node, a bearer type of a downlink packet; and when the bearer type is an SRB, sending, by the first wireless network node, the downlink packet to a second wireless network node, so that the second wireless network node performs a function of a PDCP layer on the downlink packet; or when the bearer type is a DRB, performing, by the first wireless network node, a function of a PDCP layer on the downlink packet, and sending the processed downlink packet to the second wireless network node.

With reference to the first aspect, in a first possible implementation, the method further includes:

receiving, by the first wireless network node, an uplink packet sent by the second wireless network node, where the second wireless network node performs a function of a PHY layer, a function of a MAC layer, and a function of an RLC layer on the uplink packet, and a bearer type of the uplink packet is a DRB; and performing, by the first wireless network node, the function of the PDCP layer on the uplink packet, and sending the processed uplink packet to the core network.

With reference to the first aspect or the first possible implementation, in a second possible implementation, the method further includes:

obtaining, by the first wireless network node, DRB security information and SRB security information from the core network; and storing, by the first wireless network node, the DRB security information, and sending the SRB security information to the second wireless network node, where the performing, by the first wireless network node, a function of a PDCP layer on the downlink packet includes:

performing, by the first wireless network node, the function of the PDCP layer on the downlink packet according to the DRB security information.

With reference to the second possible implementation of the first aspect, in a third possible implementation, the SRB security information and the DRB security information include one or more of an integrity protection algorithm, an integrity check algorithm, an encryption algorithm, a decryption algorithm, or a security key.

With reference to the first aspect, in a fourth possible implementation, before the learning, by a first wireless network node, a bearer type of a downlink packet, the method further includes:

receiving, by the first wireless network node, a user equipment identifier and a connection request that are sent by the second wireless network node; and when user equipment corresponding to the user equipment identifier has permission to access the second wireless network node, returning, by the first wireless network node, an admission indication carrying the user equipment identifier to the second wireless network node, where the admission indication is used to instruct the user equipment to establish an SRB between the user equipment and the second wireless network node.

With reference to any one of the first aspect to the fourth possible implementation, in a fifth possible implementation, the method further includes:

when the UE satisfies a handover condition, determining, by the first wireless network node, a target wireless network node, other than the second wireless network node, in a wireless network node set managed by the first wireless network node, and sending an identifier of the target wireless network node to the second wireless network node;

obtaining, by the first wireless network node, a transmission status parameter of service data from the second wireless network node; and after the UE completes a handover operation, transmitting, by the first wireless network node, the service data to the UE by using the target wireless network node according to the transmission status parameter.

With reference to the fifth possible implementation of the first aspect, in a sixth possible implementation, the determining, by the first wireless network node, a target wireless network node, other than the second wireless network node, in a wireless network node set managed by the first wireless network node includes:

obtaining, by the first wireless network node, a link quality parameter between each wireless network node in the wireless network node set and the user equipment, and selecting a wireless network node whose link quality parameter is optimal as the target wireless network node, where the link quality parameter includes one or more of an RSRP, an RSSI, or RSRQ.

A second aspect of the embodiments of the present invention provides a wireless network node, including:

an identification module, configured to learn a bearer type of a downlink packet; and a first sending module, configured to: when the bearer type is an SRB, send, by the first wireless network node, the downlink packet to a second wireless network node, so that the second wireless network node performs a function of a PDCP layer on the downlink packet; or a first processing module, configured to: when the bearer type is a DRB, perform a function of a PDCP layer on the downlink packet, and send the processed downlink packet to the second wireless network node.

With reference to the second aspect, in a first possible implementation, the node further includes:

a receiving module, configured to receive an uplink packet sent by the second wireless network node, where at the second wireless network node, a function of a PHY layer, a function of a MAC layer, and a function of an RLC layer are performed on the uplink packet, and a bearer type of the uplink packet is a DRB; and a second processing module, configured to perform the function of the PDCP layer on the uplink packet, and send the processed uplink packet to the core network.

With reference to the second aspect or the first possible implementation, in a second possible implementation, the node further includes:

a security information obtaining module, configured to obtain DRB security information and SRB security information from the core network, where the first wireless network node stores the DRB security information, and sends the SRB security information to the second wireless network node, where the first processing module is configured to perform the function of the PDCP layer on the downlink packet according to the DRB security information.

With reference to the second possible implementation of the second aspect, in a third possible implementation, the SRB security information and the DRB security information include one or more of an integrity protection algorithm, an integrity check algorithm, an encryption algorithm, a decryption algorithm, or a security key.

With reference to the second aspect, in a fourth possible implementation, the node further includes:

an SRB establishment module, configured to: receive a user equipment identifier and a connection request that are sent by the second wireless network node; and when user equipment corresponding to the user equipment identifier has permission to access the second wireless network node, return an admission indication carrying the user equipment identifier to the second wireless network node, where the admission indication is used to instruct the user equipment to establish an SRB between the user equipment and the second wireless network node.

With reference to any one of the second aspect to the fourth possible implementation, in a fifth possible implementation, the node further includes:

a handover module, configured to: when the UE satisfies a handover condition, determine a target wireless network node, other than the second wireless network node, in a wireless network node set managed by the wireless network node, and send an identifier of the target wireless network node to the second wireless network node; obtain a transmission status parameter of service data from the second wireless network node; and after the UE completes a handover operation, transmit the service data to the UE by using the target wireless network node according to the transmission status parameter.

With reference to the fifth possible implementation of the second aspect, in a sixth possible implementation, the handover module is configured to: obtain a link quality parameter between each wireless network node in the wireless network node set and the user equipment, and select a wireless network node whose link quality parameter is optimal as the target wireless network node, where the link quality parameter includes one or more of an RSRP, an RSSI, or RSRQ.

A third aspect of the embodiments of the present invention provides a wireless network node, including a memory and a processor, where the memory stores an instruction for implementing the data transmission method according to any one of the first aspect, and the processor invokes and executes the instruction in the memory to implement the data transmission method according to any one of the first aspect.

A fourth aspect of the embodiments of the present invention provides a storage medium, configured to control a computer device to perform a data transmission method, where the method includes the following steps:

learning a bearer type of a downlink packet; and when the bearer type is a signaling radio bearer SRB, sending the downlink packet to a second wireless network node, so that the second wireless network node performs a function of a Packet Data Convergence Protocol PDCP layer on the downlink packet; or when the bearer type is a data radio bearer DRB, performing a function of a PDCP layer on the downlink packet, and sending the processed downlink packet to the second wireless network node.

A fifth aspect of the embodiments of the present invention provides a data transmission method, including:

learning, by a second wireless network node, a bearer type of an uplink packet sent by user equipment; and when the bearer type is an SRB, performing, by the second wireless network node, a function of a PHY layer and a function of a layer higher than the PHY layer on the uplink packet; or when the bearer type is a DRB, performing, by the second wireless network node, a function of a PHY layer, a function of a MAC layer, and a function of an RLC layer on the uplink packet, and sending the processed uplink packet to a first wireless network node, so that the first wireless network node performs a function of a PDCP layer on the processed uplink packet.

With reference to the fifth aspect, in a first possible implementation, the performing, by the second wireless network node, a function of a PHY layer and a function of a layer higher than the PHY layer on the uplink packet includes:

receiving, by the second wireless network node, SRB security information sent by the first wireless network node, and performing the function of the PDCP layer on the uplink packet according to the SRB security information.

With reference to the fifth aspect or the first possible implementation, in a second possible implementation, the method further includes:

receiving, by the second wireless network node, a downlink packet sent by the first wireless network node, where a bearer type of the downlink packet is an SRB; and performing, by the second wireless network node, a function of an RRC layer and a function of a layer lower than the RRC layer on the downlink packet, and sending the processed downlink packet to the user equipment.

With reference to the fifth aspect, in a third possible implementation, the method further includes:

forwarding, by the second wireless network node to the first wireless network node, a connection request that carries a user equipment identifier and that is sent by the user equipment;

receiving, by the second wireless network node, an admission indication that is generated after the first wireless network node determines that the user equipment has access permission, where the admission indication carries the user equipment identifier;

generating, by the second wireless network node, a connection establishment message according to the admission indication, and sending the connection establishment message to the user equipment, so that the user equipment establishes an SRB according to the connection establishment message, and returns a connection establishment complete message to the second wireless network node after successfully establishing the SRB; and sending, by the second wireless network node, the received connection establishment complete message to the first wireless network node.

With reference to the first possible implementation of the fifth aspect, in a fourth possible implementation, the method further includes:

determining, by the second wireless network node when the user equipment satisfies a handover condition, a target wireless network node to which the user equipment is to be handed over;

sending, by the second wireless network node, a handover request message carrying the SRB security information to the target wireless network node, so that after preparing a handover resource, the target wireless network node returns a handover command message to the second wireless network node; and forwarding, by the second wireless network node, the handover command message to the user equipment, where the handover command message carries the SRB security information, so that after completing a handover operation, the user equipment returns a handover complete message to the target wireless network node, and after receiving the handover complete message, the target wireless network access node performs security protection on signaling data according to the SRB security information.

With reference to the fourth possible implementation of the fifth aspect, in a fifth possible implementation, the determining, by the second wireless network node when detecting that the user equipment satisfies a handover condition, a target wireless network node to which the user equipment is to be handed over includes:

when a signal carrier level of the user equipment is less than a first threshold, determining, by the second wireless network node, that the user equipment satisfies the handover condition; or when a signal carrier-to-interference ratio of the user equipment is less than a second threshold, determining, by the second wireless network node, that the user equipment satisfies the handover condition; or when a distance between the second wireless network node and the user equipment is greater than a third threshold, determining, by the second wireless network node, that the user equipment satisfies the handover condition; and receiving, by the second wireless network node, a handover indication that carries an identity of the target wireless network node and that is sent by the first wireless network node, and determining the target wireless network node according to the identity.

A sixth aspect of the embodiments of the present invention provides a wireless network node, including:

an identification module, configured to learn a bearer type of an uplink packet sent by user equipment; and a first processing module, configured to: when the bearer type is an SRB, perform a function of a PHY layer and a function of a layer higher than the PHY layer on the uplink packet; or a first sending module, configured to: when the bearer type is a DRB, perform a function of a PHY layer, a function of a MAC layer, and a function of an RLC layer on the uplink packet, and send the processed uplink packet to a first wireless network node, so that the first wireless network node performs a function of a PDCP layer on the processed uplink packet.

With reference to the sixth aspect, in a first possible implementation, the first processing module is configured to: receive SRB security information sent by the first wireless network node, and perform the function of the PDCP layer on the uplink packet according to the SRB security information.

With reference to the sixth aspect or the first possible implementation, in a second possible implementation, the node further includes:

a receiving module, configured to receive a downlink packet sent by the first wireless network node, where a bearer type of the downlink packet is an SRB; and a second processing module, configured to: perform a function of an RRC layer and a function of a layer lower than the RRC layer on the downlink packet, and send the processed downlink packet to the user equipment.

With reference to the sixth aspect, in a fourth possible implementation, the node further includes:

an SRB establishment module, configured to: forward, to the first wireless network node, a connection request that carries a user equipment identifier and that is sent by the user equipment; receive an admission indication that is generated after the first wireless network node determines that the user equipment has access permission, where the admission indication carries the user equipment identifier; generate a connection establishment message according to the admission indication, and send the connection establishment message to the user equipment, so that the user equipment establishes an SRB according to the connection establishment message, and returns a connection establishment complete message to the second wireless network node after successfully establishing the SRB; and send the received connection establishment complete message to the first wireless network node.

With reference to the first possible implementation of the sixth aspect, in a fifth possible implementation, the node further includes:

a handover module, configured to: determine, when the user equipment satisfies a handover condition, a target wireless network node to which the user equipment is to be handed over; send a handover request message carrying the SRB security information to the target wireless network node, so that after preparing a handover resource, the target wireless network node returns a handover command message to the second wireless network node; and forward the handover command message to the user equipment, where the handover command message carries the SRB security information, so that after completing a handover operation, the user equipment returns a handover complete message to the target wireless network node, and after receiving the handover complete message, the target wireless network access node performs security protection on signaling data according to the SRB security information.

With reference to the fifth possible implementation of the sixth aspect, in a sixth possible implementation, the handover module is configured to:

when a signal carrier level of the user equipment is less than a first threshold, determine that the user equipment satisfies the handover condition; or when a signal carrier-to-interference ratio of the user equipment is less than a second threshold, determine that the user equipment satisfies the handover condition; or when a distance between the wireless network node and the user equipment is greater than a third threshold, determine that the user equipment satisfies the handover condition; and receive a handover indication that carries an identity of the target wireless network node and that is sent by the first wireless network node, and determine the target wireless network node according to the identity.

A seventh aspect of the embodiments of the present invention provides a wireless network node, including a memory and a processor, where the memory stores an instruction for implementing the data transmission method according to any one of the fifth aspect, and the processor invokes and executes the instruction in the memory to implement the data transmission method according to any one of the fifth aspect.

An eighth aspect of the embodiments of the present invention provides a storage medium, configured to control a computer device to perform a data transmission method, where the method includes the following steps:

learning a bearer type of an uplink packet sent by user equipment; and when the bearer type is an SRB, performing a function of a PHY layer and a function of a layer higher than the PHY layer on the uplink packet; or when the bearer type is a DRB, performing a function of a PHY layer, a function of a MAC layer, and a function of an RLC layer on the uplink packet, and sending the processed uplink packet to a first wireless network node, so that the first wireless network node performs a function of a PDCP layer on the processed uplink packet.

A ninth aspect of the embodiments of the present invention provides a data transmission method, including:

receiving, by a first wireless network node, an uplink packet sent by a second wireless network device, where the uplink packet carries first indication information indicating identity information of user equipment, information about a bearer type, and identity information of a bearer;

learning, by the first wireless network node according to the first indication information, the user equipment, the bearer type, and the bearer that correspond to the uplink packet; and performing, by the first wireless network node, a function of a PDCP layer on the uplink packet.

With reference to the ninth aspect, in a first possible implementation, the implementing, by the first wireless network node, a function of a PDCP layer on the uplink packet includes:

learning, by the first wireless network node, the bearer type of the uplink packet; and when the bearer type of the uplink packet is a DRB, performing the function of the PDCP layer on the second packet according to DRB security information, and sending the processed uplink packet to a core network; or when the bearer type of the uplink packet is an SRB, performing the function of the PDCP layer and a function of an RRC layer on the second packet according to SRB security information.

With reference to the first possible implementation of the ninth aspect, in a second possible implementation, the method further includes:

receiving, by the first wireless network node, a downlink packet sent by the core network, where the downlink packet carries second indication information indicating identity information of user equipment, information about a bearer type, and identity information of a bearer; and implementing, by the first wireless network node, the function of the RRC layer and the function of the PDCP layer on the packet, and sending the processed downlink packet to the second wireless network node, so that the second wireless network node learns the user equipment, the bearer type, and the bearer of the downlink packet according to the second indication information.

With reference to any one of the ninth aspect to the second possible implementation, in a third possible implementation, the method further includes:

determining, by the first wireless network node when the user equipment satisfies a handover condition, a target wireless network node to which the user equipment is to be handed over, and obtaining UE context information of the second wireless network node;

sending, by the first wireless network node, a handover request message carrying the UE context information to the target wireless network node, so that after determining that the user equipment has access permission and preparing a handover resource, the target wireless network node returns a handover response message to the first wireless network node; and receiving, by the first wireless network node, the handover response message returned by the target wireless network node, and forwarding the handover response message to the second wireless network node, so that the second wireless network node sends a handover command message to the user equipment according to the handover response message, where the handover command message is used to instruct the user equipment to complete a handover operation.

With reference to any one of the ninth aspect to the second possible implementation, in a fourth possible implementation, the method further includes:

determining, by the first wireless network node when the UE satisfies a handover condition, a target wireless network node to which the user equipment is to be handed over;

sending, by the first wireless network node, a handover indication message carrying an identifier of the target wireless network node to the second wireless network node, where the handover indication message is used to instruct the wireless network node to obtain UE context information of the user equipment and send a handover requirement message carrying the UE context information to the first wireless network node;

sending, by the first wireless network node, a handover request message to the target wireless network node according to the handover requirement message, so that after determining that the user equipment has access permission, the target wireless network node returns a handover response message to the first wireless network node; and after receiving the handover response message returned by the target wireless network node, sending, by the first wireless network node, the handover response message to the second wireless network node, so that the wireless network node sends a handover command message to the user equipment according to the handover response message, where the handover command message is used to instruct the user equipment to complete a handover operation.

A tenth aspect of the embodiments of the present invention provides a wireless network node, including:

a first receiving module, configured to receive an uplink packet sent by a second wireless network device, where the uplink packet carries first indication information indicating identity information of user equipment, information about a bearer type, and identity information of a bearer;

an identification module, configured to learn, according to the first indication information, the user equipment, the bearer type, and the bearer that correspond to the uplink packet; and a first processing module, configured to perform a function of a PDCP layer on the uplink packet.

With reference to the tenth aspect, in a first possible implementation, the first processing module is configured to: learn the bearer type of the uplink packet; and when the bearer type of the uplink packet is a DRB, perform the function of the PDCP layer on the second packet according to DRB security information and send the processed uplink packet to a core network; or when the bearer type of the uplink packet is an SRB, perform the function of the PDCP layer and a function of an RRC layer on the second packet according to SRB security information.

With reference to the tenth aspect or the first possible implementation, in a second possible implementation, the node further includes:

a second receiving module, configured to receive a downlink packet sent by the core network, where the downlink packet carries second indication information indicating identity information of user equipment, information about a bearer type, and identity information of a bearer; and a second processing module, configured to: implement the function of the RRC layer and the function of the PDCP layer on the packet, and send the processed downlink packet to the second wireless network node, so that the second wireless network node learns the user equipment, the bearer type, and the bearer of the downlink packet according to the second indication information.

With reference to any one of the tenth aspect to the second possible implementation, in a third possible implementation, the node further includes:

a first handover module, configured to: determine, when the user equipment satisfies a handover condition, a target wireless network node to which the user equipment is to be handed over, and obtain UE context information of the second wireless network node;

send a handover request message carrying the UE context information to the target wireless network node, so that after determining that the user equipment has access permission and preparing a handover resource, the target wireless network node returns a handover response message to the first wireless network node; and receive the handover response message returned by the target wireless network node, and forward the handover response message to the second wireless network node, so that the second wireless network node sends a handover command message to the user equipment according to the handover response message, where the handover command message is used to instruct the user equipment to complete a handover operation.

With reference to any one of the tenth aspect to the second possible implementation, in a fourth possible implementation, the node further includes:

a second handover module, configured to: determine, when the UE satisfies a handover condition, a target wireless network node to which the user equipment is to be handed over;

send a handover indication message carrying an identifier of the target wireless network node to the second wireless network node, where the handover indication message is used to instruct the wireless network node to obtain UE context information of the user equipment and send a handover requirement message carrying the UE context information to the first wireless network node;

send a handover request message to the target wireless network node according to the handover requirement message, so that after determining that the user equipment has access permission, the target wireless network node returns a handover response message to the first wireless network node; and after receiving the handover response message returned by the target wireless network node, send the handover response message to the second wireless network node, so that the wireless network node sends a handover command message to the user equipment according to the handover response message, where the handover command message is used to instruct the user equipment to complete a handover operation.

An eleventh aspect of the embodiments of the present invention provides a wireless network node, including a memory and a processor, where the memory stores an instruction for implementing the data transmission method according to any one of the ninth aspect, and the processor invokes and executes the instruction in the memory to implement the data transmission method according to any one of the ninth aspect.

A twelfth aspect of the embodiments of the present invention provides a storage medium, configured to control a computer device to perform a data transmission method, where the method includes the following steps:

receiving an uplink packet sent by a second wireless network device, where the uplink packet carries first indication information indicating identity information of user equipment, information about a bearer type, and identity information of a bearer;

learning, according to the first indication information, the user equipment, the bearer type, and the bearer that correspond to the uplink packet; and performing a function of a PDCP layer on the uplink packet.

A thirteenth aspect of the embodiments of the present invention provides a data transmission method, including:

receiving, by a second wireless network node, a downlink packet sent by a first wireless network node, where the downlink packet carries first indication information indicating identity information of user equipment, information about a bearer type, and identity information of a bearer;

learning, by the second wireless network node according to the first indication information, the user equipment, the bearer type, and the bearer that correspond to the downlink packet; and performing, by the second wireless network node, a function of a layer lower than a PDCP layer on the downlink packet.

With reference to the thirteenth aspect, in a first possible implementation, the method further includes:

receiving, by the second wireless network node, an uplink packet sent by user equipment, where the uplink packet carries second indication information indicating identity information of the user equipment, information about a bearer type, and identity information of a bearer; and performing, by the second wireless network node, the function of the layer lower than the PDCP layer on the uplink packet, and sending the processed uplink packet to the first wireless network node, so that the first wireless network node performs a function of a PDCP layer on the processed uplink packet.

With reference to the thirteenth aspect or the first possible implementation, in a second possible implementation, the method further includes:

forwarding, by the second wireless network node, a measurement report sent by the user equipment to the first wireless network node, so that when the first wireless network node detects, according to the measurement report, that the user equipment satisfies a handover condition, the first wireless network node determines a target wireless network node to which the user equipment is to be handed over, and the first wireless network node returns a handover indication carrying an identity of the target wireless network node to the second wireless network node; and after receiving the handover indication carrying the identity of the target wireless network node, obtaining, by the second wireless network node, UE context information of the user equipment, and sending a handover requirement message carrying the UE context information to the first wireless network node.

A fourteenth aspect of the embodiments of the present invention provides a wireless network node, including:

a first receiving module, configured to receive a downlink packet sent by the first wireless network node, where the downlink packet carries first indication information indicating identity information of user equipment, information about a bearer type, and identity information of a bearer;

an identification module, configured to learn, according to the first indication information, the user equipment, the bearer type, and the bearer that correspond to the downlink packet; and a first processing module, configured to perform a function of a layer lower than a PDCP layer on the downlink packet.

With reference to the fourteenth aspect, in a first possible implementation, the node further includes:

a second receiving module, configured to receive an uplink packet sent by user equipment, where the uplink packet carries second indication information indicating identity information of the user equipment, information about a bearer type, and identity information of a bearer; and a second processing module, configured to perform the function of the layer lower than the PDCP layer on the uplink packet and send the processed uplink packet to the first wireless network node, so that the first wireless network node performs a function of a PDCP layer on the processed uplink packet.

With reference to the fourteenth aspect or the first possible implementation, in a second possible implementation, the node further includes:

a handover module, configured to: forward, to the first wireless network node, a measurement report sent by the user equipment, so that when the first wireless network node detects, according to the measurement report, that the user equipment satisfies a handover condition, the first wireless network node determines a target wireless network node to which the user equipment is to be handed over, and the first wireless network node returns a handover indication carrying an identity of the target wireless network node to the second wireless network node; and after receiving the handover indication carrying the identity of the target wireless network node, obtain UE context information of the user equipment, and send a handover requirement message carrying the UE context information to the first wireless network node.

A fifteenth aspect of the embodiments of the present invention provides a wireless network node, including a memory and a processor, where the memory stores an instruction for implementing the data transmission method according to any one of the third aspect, and the processor invokes and executes the instruction in the memory to implement the data transmission method according to any one of the third aspect.

A sixteenth aspect of the embodiments of the present invention provides a storage medium, configured to control a computer device to perform a data transmission method, where the method includes the following steps:

receiving a downlink packet sent by the first wireless network node, where the downlink packet carries first indication information indicating identity information of user equipment, information about a bearer type, and identity information of a bearer;

learning, according to the first indication information, the user equipment, the bearer type, and the bearer that correspond to the downlink packet; and performing a function of a layer lower than a PDCP layer on the downlink packet.

Implementation of the present invention has the following beneficial effects:

Layers of a first wireless network node and a second wireless network node are re-divided: The first wireless network node is responsible for performing security protection on service data carried in a DRB, and the second wireless network node is responsible for performing security protection on signaling data carried in an SRB; alternatively, the first wireless network node is responsible for processing of an RRC layer and a PDCP layer, and the second wireless network node is responsible for processing of a layer lower than the PDCP layer. Compared with a CPRI interface in the prior art, this structure reduces an amount of data transmitted between the two network nodes, thereby lowering requirements for a transmission bandwidth and a delay between the two network nodes.

BRIEF DESCRIPTION OF DRAWINGS

To describe the technical solutions in the embodiments of the present invention, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
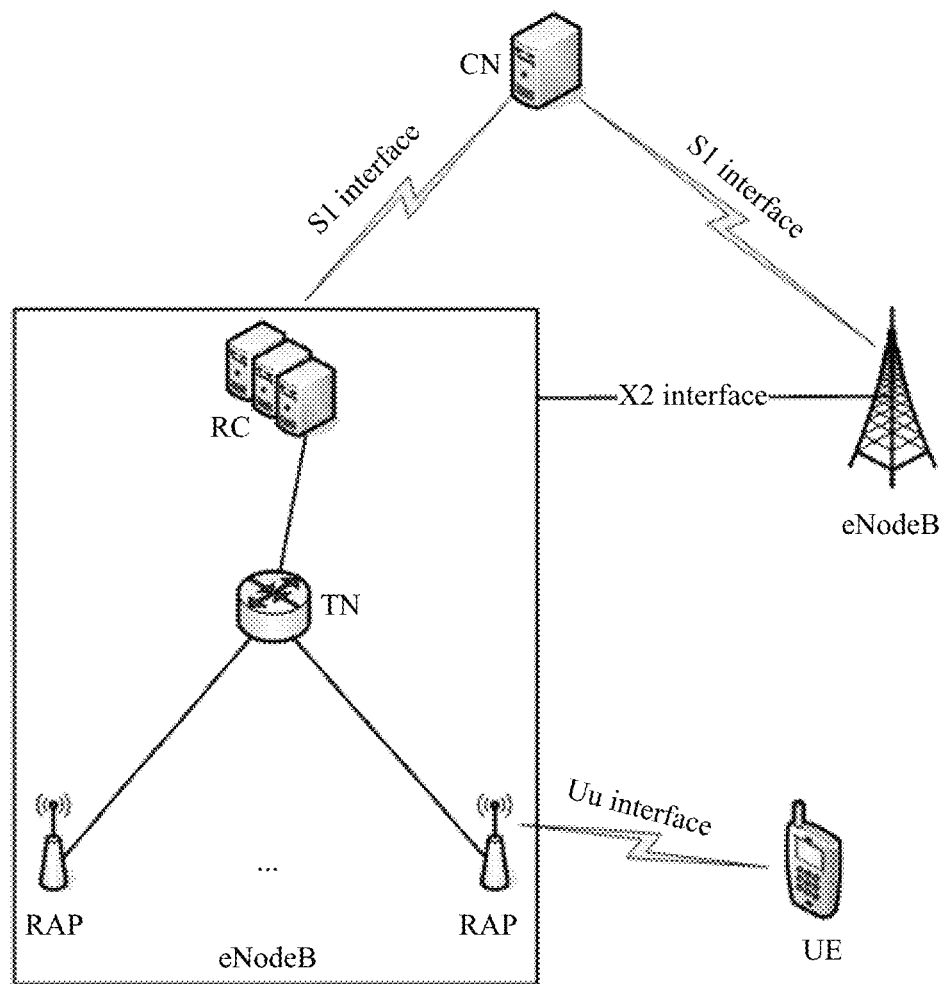
FIG. 1 is a structural diagram of a network according to an embodiment of the present invention.

Referring to FIG. 1, FIG. 1 is a structural diagram of an LTE (Long Term Evolution, Long Term Evolution, LTE for short) based network according to an embodiment of the present invention. An access network includes an RC and a RAP cluster. The RC (Radio Access Network Controller, radio access network controller, RC for short) manages the RAP (Radio Access Point, radio access point, RAP for short) cluster. The RAP cluster includes at least one RAP. The RC is connected to the RAP cluster by using a TN (Transportation Network, transportation network, TN for short). UE is connected to at least one RAP in the RAP cluster. The RC is connected to a core network by using an S1 interface. The core network includes a mobility management entity MME, a serving gateway SGW, and a packet data network gateway PGW. A control plane and a user plane of the core network are separated. On the control plane, the MME is connected to the RC by using an S1-MME interface. On the user plane, the SGW is connected to the RC by using an S1-U interface. The RC and the managed RAP cluster are equivalent to an eNodeB (evolved Node B, evolved NodeB) in an LTE network architecture. The RC is connected to the eNodeB by using an X2 interface. The eNodeB is connected to the core network by using the S1 interface. The UE accesses the core network by using a RAP in the RAP cluster.

In addition to the foregoing LTE communications standard, the present invention may be applied to GSM (Global System of Mobile Communication) or CDMA (Code Division Multiple Access), or may be applied to WCDMA (Wideband Code Division Multiple Access) or a future 5G network standard, or may be applied to another communications standard such as a wireless local area network (Wireless Local Area Network, WLAN), Worldwide Interoperability for Microwave Access (Worldwide Interoperability for Microwave Access, WiMAX), Bluetooth, or infrared.

Figure 2:
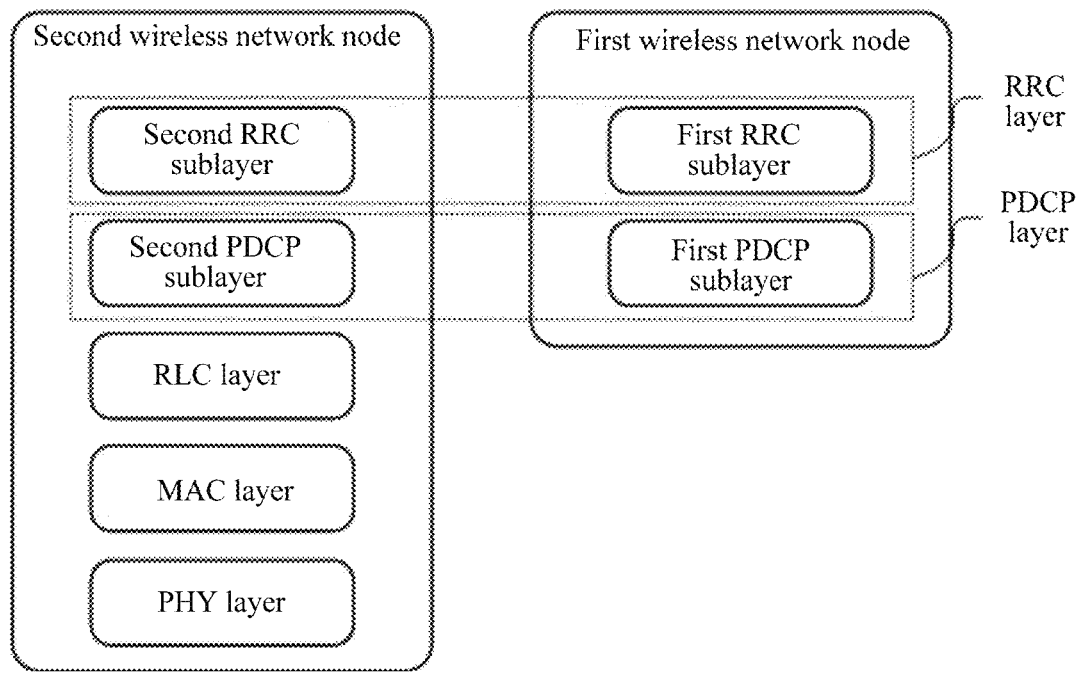
FIG. 2 is a schematic structural diagram of a base station according to an embodiment of the present invention.

Referring to FIG. 2, FIG. 2 is a schematic structural diagram of a base station according to an embodiment of the present invention. In this embodiment of the present invention, an evolved NodeB includes a first wireless network node and a second wireless network node. The first wireless network node includes functions that correspond to a first RRC (radio resource control, RRC for short) sublayer and a first PDCP (packet data convergence protocol, PDCP for short) sublayer. The second wireless network node includes functions that correspond to a second RRC sublayer, a second PDCP sublayer, an RLC (radio link control, RLC for short) layer, a MAC (media access control, MAC for short) layer, and a PHY (physical, PHY for short) layer. The first RRC sublayer and the second RRC sublayer form an RRC layer. A function of the first RRC sublayer is global RRC configuration management. A function of the second RRC sublayer is SRB (signaling radio bearer, SRB for short) generation, sending, and receiving, and local RRC configuration management. A function of the first PDCP sublayer is DRB (data radio bearer, DRB for short) processing. A function of the second PDCP sublayer is SRB processing.

Compared with a remote interface in an existing RRH (remote radio head, RRH for short) remote manner, a structure of the base station in this embodiment of the present invention reduces an amount of data transmitted by using an interface for transmission between an RC and a RAP, which helps to reduce an amount of data exchanged between the RC (radio access network controller, RC for short) and the RAP (radio access point, RAP for short). Therefore, requirements for a transmission bandwidth and a delay are lowered.

Figure 3:
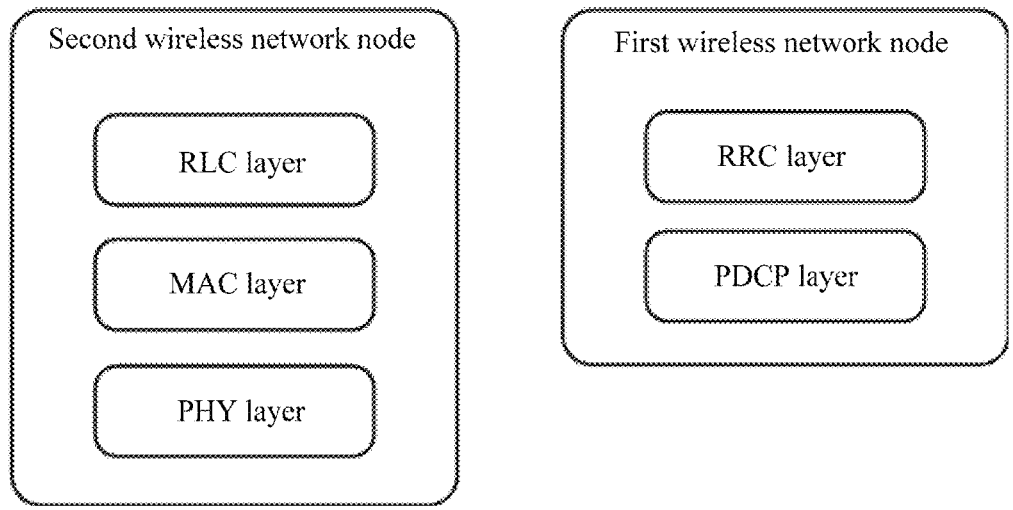
FIG. 3 is another schematic structural diagram of a base station according to an embodiment of the present invention.

Referring to FIG. 3, FIG. 3 is a schematic structural diagram of a base station according to an embodiment of the present invention. In this embodiment of the present invention, an evolved NodeB includes a first wireless network node and a second wireless network node. The first wireless network node includes an RRC layer and a PDCP layer, and is configured to implement functions that correspond to the RRC layer and the PDCP layer. The second wireless network node includes an RLC layer, a MAC layer, and a PHY layer, and is configured to implement functions that correspond to the RLC layer, the MAC layer, and the PHY layer. The function that corresponds to the PDCP layer includes: header compression, security, and reordering. The function that corresponds to the RLC layer includes: segmentation, cascading, and an ARQ (automatic repeat request). The function that corresponds to the MAC layer includes: scheduling, logical channel priority processing, a HARQ (hybrid automatic repeat request), and the like. The function that corresponds to the PHY layer includes: modulation and demodulation, encoding, and multi-antenna mapping. Compared with a remote interface in an existing RRH remote manner, a structure of the base station in this embodiment of the present invention reduces an amount of data transmitted by using an interface for transmission between an RC and a RAP, which helps to reduce an amount of data exchanged between the RC and the RAP. Therefore, requirements for a transmission bandwidth and a delay are lowered.

Figure 4:
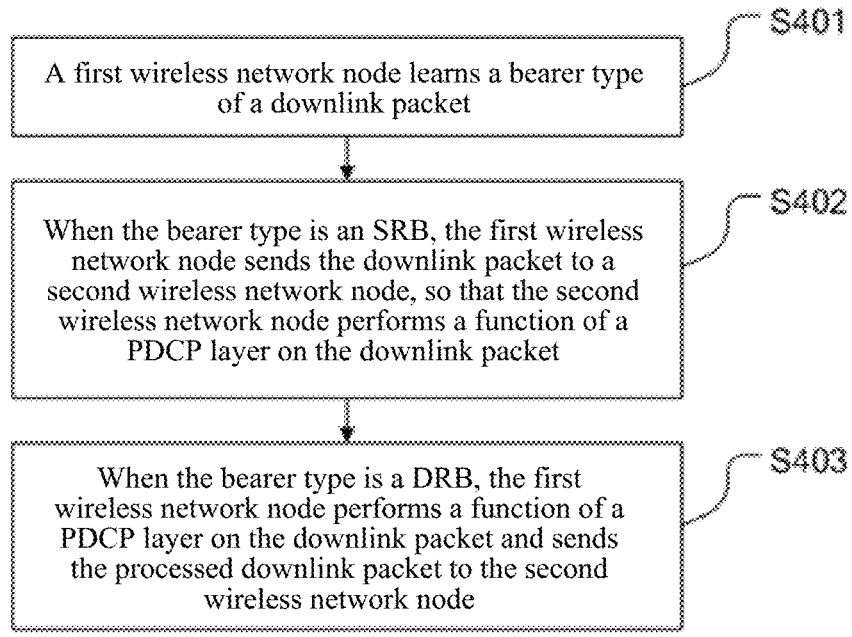
FIG. 4 is a schematic flowchart of a data transmission method according to a first embodiment of the present invention.

Referring to FIG. 4, FIG. 4 is a schematic flowchart of a data transmission method according to a first embodiment of the present invention. In this embodiment of the present invention, a data protection method according to this embodiment of the present invention is implemented by using the network architecture in FIG. 2. The method includes the following steps.

S401: A first wireless network node learns a bearer type of a downlink packet.

Specifically, the first wireless network node receives the downlink packet delivered by a core network. The bearer type of the downlink packet is an SRB or a DRB, that is, the downlink packet is service data or signaling data. The first wireless network node may learn the bearer type of the downlink packet according to a bearer type identifier carried in the downlink packet.

S402: When the bearer type is an SRB, the first wireless network node sends the downlink packet to a second wireless network node, so that the second wireless network node performs PDCP layer processing on the downlink packet.

Specifically, if the bearer type of the downlink packet is an SRB, that is, the downlink packet is signaling data, the first wireless network node does not process the signaling data. The first wireless network node forwards the downlink packet to the second wireless network node; an RRC layer of the second wireless network node learns that the downlink packet is the signaling data; then a PDCP layer, an RLC layer, a MAC layer, and a PHY layer of the second wireless network node separately process the downlink packet; and the second wireless network node sends the processed downlink packet to user equipment.

S403: When the bearer type is a DRB, the first wireless network node performs PDCP layer processing on the downlink packet, and sends the processed downlink packet to the second wireless network node.

Specifically, if the bearer type of the downlink packet is a DRB, that is, the downlink packet is service data, the first wireless network node performs PDCP layer processing on the downlink packet. The PDCP layer processing includes one or more of header compression, security, or reordering. The first wireless network node sends the downlink packet obtained after the PDCP layer processing to the second wireless network node, the second wireless network node continues to perform RLC layer processing, MAC layer processing, and PHY layer processing on the downlink packet, and after completing the foregoing processing, the second wireless network node sends the processed downlink packet to the user equipment.

Optionally, the first wireless network node receives an uplink packet sent by the second wireless network node. At the second wireless network node, the PHY layer processing, the MAC layer processing, and the RLC layer processing are implemented on the uplink packet, and a bearer type of the uplink packet is a DRB.

The first wireless network node performs the PDCP layer processing on the uplink packet and sends the processed uplink packet to the core network.

Specifically, the second wireless network node is responsible for processing the signaling data, and the first wireless network node is responsible for processing the service data. The second wireless network node receives an uplink packet sent by user equipment; performs the PHY layer processing, the MAC layer processing, and the RLC layer processing on the uplink packet; and sends, after learning that a bearer type of the uplink packet is a DRB, the processed uplink packet to the first wireless network node that continues to perform the PDCP layer processing on the uplink packet. The performing, by the first wireless network node, the PDCP layer processing on the uplink packet includes: performing security processing on the uplink packet according to obtained DRB security information.

Optionally, the method further includes: obtaining, by the first wireless network node, DRB security information and SRB security information from the core network; and sending, by the first wireless network node, the SRB security information to the second wireless network node, where the performing, by the first wireless network node, PDCP layer processing on the downlink packet includes:

performing, by the first wireless network node, the PDCP layer processing on the downlink packet according to the DRB security information.

Specifically, the first wireless network node performs the PDCP layer processing on the service data by using the DRB security information, that is, performs security protection on the packet whose bearer type is a DRB. The first wireless network node sends the SRB security information to the second wireless network node, and the second wireless network node performs the PDCP layer processing on the signaling data.

The SRB security information and the DRB security information include at least one of the following: an integrity protection algorithm, an integrity check algorithm, an encryption algorithm, a decryption algorithm, or a security key. The integrity protection algorithm is used to add redundant information to a message to protect integrity of the message. The integrity check algorithm is used to determine, according to the redundant information in the message, whether the message is changed. The encryption algorithm is used to encrypt a message to generate ciphertext, and an encryption key is used during the encryption. The decryption algorithm is used to decrypt the ciphertext to generate plaintext, and a decryption key is used during the decryption. The integrity protection algorithm and the integrity check algorithm may be a same algorithm. The encryption algorithm and the decryption algorithm may also be a same algorithm. A key used during integrity protection, a key used during an integrity check, the encryption key used during the encryption, and the decryption key used during the decryption may be a same security key, or may be different security keys derived based on a same security key.

It may be understood that the SRB security information and the DRB security information may be obtained from the core network, or may be obtained from another network node. This is not limited in the present invention.

During implementation of this embodiment of the present invention, a first wireless network node is responsible for performing security protection on service data carried in a DRB, and a second wireless network node is responsible for performing security protection on signaling data carried in an SRB. Work division of the first wireless network node and the second wireless network node can reduce an amount of data transmitted between the first wireless network node and the second wireless network node, thereby lowering a requirement for a transmission bandwidth between the first wireless network node and the second wireless network node, rapidly completing underlying configuration, and ensuring service continuity to the maximum extent.

Figure 5:
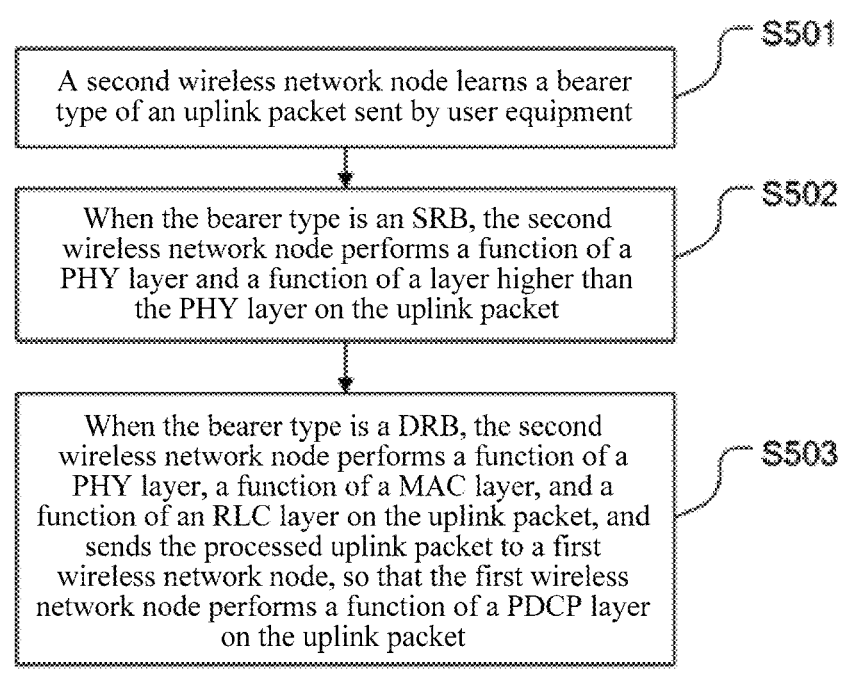
FIG. 5 is a schematic flowchart of a data transmission method according to a second embodiment of the present invention.

Referring to FIG. 5, FIG. 5 is a schematic flowchart of a data transmission method according to a second embodiment of the present invention. In this embodiment of the present invention, the method includes the following steps.

S501: A second wireless network node learns a bearer type of an uplink packet sent by UE.

Specifically, the UE sends the uplink packet to the second wireless network node. The bearer type of the uplink packet is an SRB or a DRB, that is, the uplink packet is service data or signaling data. The second wireless network node may learn the bearer type of the uplink packet according to a bearer type identifier carried in the uplink packet.

S502: When the bearer type is an SRB, the second wireless network node completes PHY layer processing, MAC layer processing, RLC layer processing, PDCP layer processing, and RRC layer processing on the uplink packet.

Specifically, if the bearer type of the uplink packet is an SRB, that is, the uplink packet is signaling data, the second wireless network node completes the PHY layer processing, the MAC layer processing, the RLC layer processing, the PDCP layer processing, and the RRC layer processing on the uplink packet. After the processing, RRC signaling is generated. The performing, by the second wireless network node, PDCP layer processing on the uplink packet includes: performing security protection on the uplink packet by using SRB security information.

S503: When the bearer type is a DRB, the second wireless network node sends the uplink packet to a first wireless network node, so that the first wireless network node completes the PDCP layer processing on the uplink packet.

Specifically, if the bearer type of the uplink packet is a DRB, that is, the uplink packet is service data, the second wireless network node does not perform the PDCP layer processing on the service data. After completing the PHY layer processing, the MAC layer processing, and the RLC layer processing on the uplink packet, the second wireless network node sends the processed uplink packet to the first wireless network node, and the first wireless network node continues to perform the PDCP layer processing on the uplink packet. The PDCP layer processing includes: performing security protection on the uplink packet by using DRB security information.

The SRB security information and the DRB security information may be obtained by the first wireless network node from a core network. The SRB security information and the DRB security information include at least one of the following: an integrity protection algorithm, an integrity check algorithm, an encryption algorithm, a decryption algorithm, or a security key. The first wireless network node performs security protection on the service data by using the DRB security information. In addition, the first wireless network node sends the SRB security information to the second wireless network node, and the second wireless network node performs security protection on the signaling data according to the SRB security information.

During implementation of this embodiment of the present invention, a first wireless network node is responsible for performing security protection on service data carried in a DRB, and a wireless network node is responsible for performing security protection on signaling data carried in an SRB. Work division of the first wireless network node and the wireless network node can reduce an amount of data transmitted between the first wireless network node and the wireless network node, thereby lowering a requirement for a transmission bandwidth between the first wireless network node and the wireless network node, rapidly completing underlying configuration, and ensuring service continuity to the maximum extent.

An example in which an RC is the first wireless network node, and a RAP accessed by UE is the wireless network node is used below to describe a data protection method in this embodiment of the present invention in detail.

Figure 6:
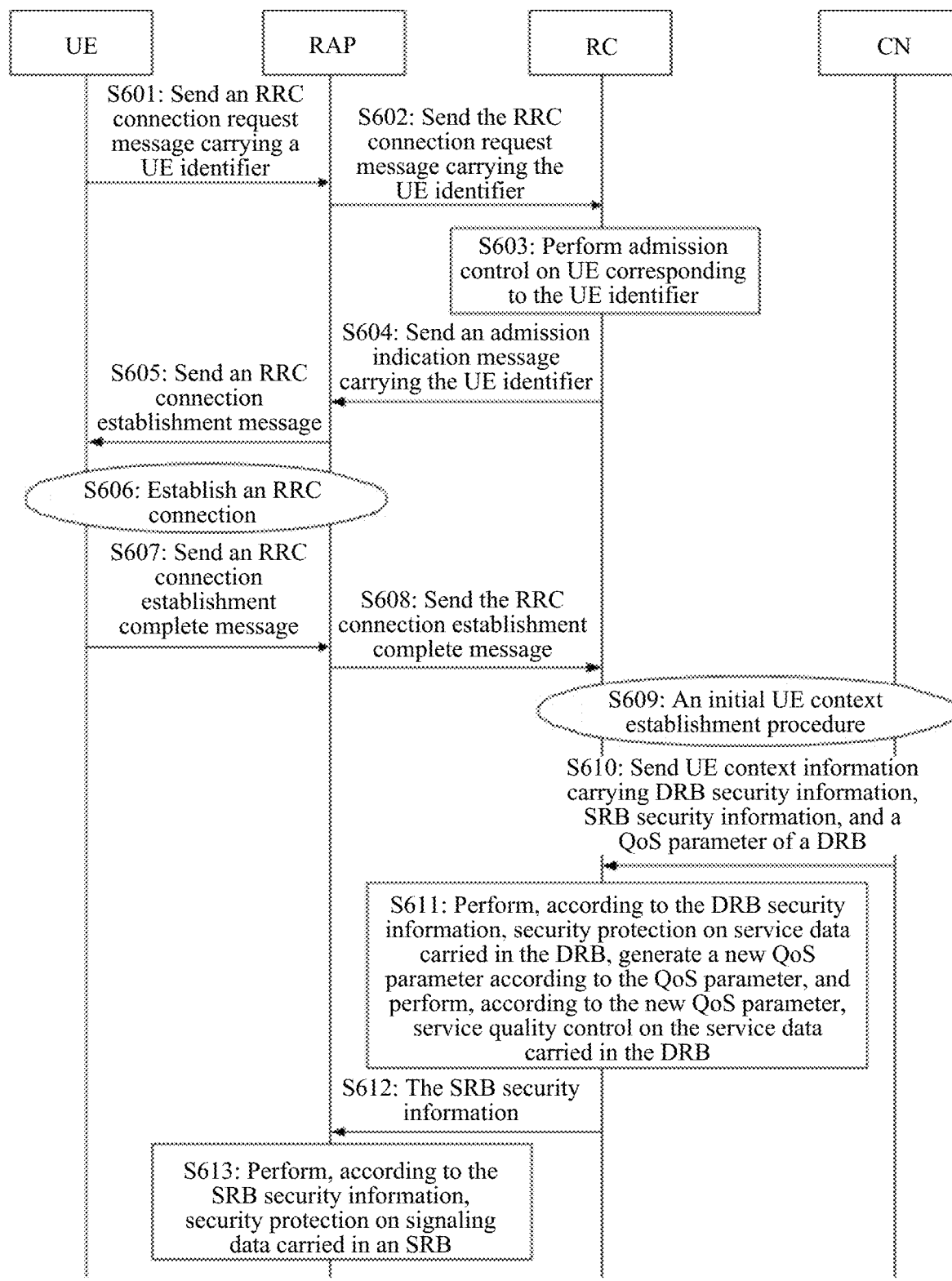
FIG. 6 is a schematic flowchart of a data transmission method according to a third embodiment of the present invention.

Referring to FIG. 6, FIG. 6 is a schematic flowchart of a data transmission method according to a third embodiment of the present invention. The data transmission method in this embodiment of the present invention is implemented by using the architecture in FIG. 2. In this embodiment of the present invention, an RC is a first wireless network node and a RAP is a second wireless network node. The method includes the following steps.

S601: UE sends an RRC connection establishment request message to the RAP, where the RRC connection request carries a UE identifier of the UE.

Specifically, the UE sends the RRC connection establishment request message to the RAP. The RRC connection establishment request message is used by the UE to establish an RRC connection to the RAP. The RRC connection request is sent by using a default SRB (an SRB 0). The RRC connection request is used by the UE to establish an RRC connection to a network and establish a new SRB, such as an SRB 1, an SRB 2, or an SRB 3. The UE identifier may be an S-TMSI or a C-RNTI or the like, and is used to identify a unique identity of the UE.

S602: The RAP sends the RRC connection request and the UE identifier to the RC.

Specifically, the RC is in a one-to-many correspondence with the RAP. The RAP uniquely corresponds to one RC. The RAP determines, according to the correspondence, the RC to which the RAP belongs, and sends the RRC connection request and the UE identifier to the RC. The UE identifier may be included in the RRC connection request.

S603: The RC performs admission control on the user equipment corresponding to the UE identifier.

Specifically, the RC determines whether the UE has permission to access the RAP, and if the UE has permission to access the RAP, performs S604. A method for determining, by the RC, whether the UE has permission to access the RAP may be: the RC determines, according to one or more of load status parameters of the RAP and a surrounding RAP, interference status parameters of the RAP and the surrounding RAP, service type information of the UE, or subscription information of the UE, whether the UE has permission to access the RAP. For example, if the RAP is overloaded, and in the subscription information of the UE, an access class of the UE is lower than a preset access class, the RC rejects access of the UE to the RAP; otherwise, the RC allows the UE to access the RAP.

S604: The RC returns an admission indication carrying the UE identifier to the RAP, where the admission indication message is used to indicate that the UE is allowed to access the RAP.

S605: The RAP sends an RRC connection establishment message to the UE.

Specifically, the RAP generates the RRC connection establishment message after receiving the admission indication sent by the RC, and sends the generated RRC connection establishment message to the user equipment corresponding to the UE identifier.

S606: The UE establishes an RRC connection to the RAP, and after completing establishment of the RRC connection, the UE returns an RRC connection establishment complete message to the RAP.

Specifically, after the UE successfully establishes the RRC connection, it indicates that a new SRB is successfully established. The RRC connection establishment complete message returned by the UE to the RAP is transmitted in the new SRB.

S607: The UE returns the RRC connection establishment complete message to the RAP. When receiving the RRC connection establishment complete message, the RAP learns that the new SRB is successfully established.

S608: The RAP returns an RRC connection establishment complete indication to the RC. When receiving the RRC connection establishment complete indication, the RC learns that the new SRB is successfully established.

It should be noted that procedures of the foregoing S601 to S607 are completed by a second RRC sublayer on the RAP and a first RRC sublayer on the RC that are shown in FIG. 2.

S609: The RC triggers an initial UE context establishment procedure to a core network.

Specifically, after receiving the RRC connection establishment complete indication sent by the RAP, the RC triggers and completes the initial UE context establishment procedure. For example, the RC sends an initial UE context establishment request message, and after the initial UE context establishment procedure is completed, the core network sends UE context information to the RC.

S610: Send UE context information carrying DRB security information and SRB security information and/or a QoS parameter of a DRB.

Specifically, the RC sends the DRB security information, the SRB security information, and the QoS parameter of the DRB to the RAP. The RAP generates an RRC connection reconfiguration message according to one or more of the foregoing information. The RRC connection reconfiguration message is used to complete DRB establishment for the UE, SRB reconfiguration, and security activation. The RAP stores the SRB security information and the QoS parameter of the DRB.

S611: Perform, according to the DRB security information, security protection on service data carried in the DRB, and perform, according to the QoS parameter, service quality control on the service data carried in the DRB.

Specifically, the UE context information includes: the DRB security information, the SRB security information, and the QoS parameter of the DRB. The DRB security information and the SRB security information include: a security key, an encryption algorithm, a decryption algorithm, an integrity protection algorithm, and an integrity check algorithm. The DRB security information and the SRB security information may be the same, that is, same security information is used to perform security protection on the DRB and the SRB. The QoS parameter indicates a service quality requirement for the service data transmitted in the DRB. For example, the QoS parameter includes a maximum transmission rate, a minimum guaranteed rate, or a transmission delay. The QoS parameter may be delivered by the core network to the RC, and the RC adjusts the QoS parameter according to the load status parameters of the RAP and the surrounding RAP to generate a new QoS parameter. The RC further triggers DRB establishment for the UE, SRB reconfiguration for the UE, and security configuration.

A downlink direction of data transmission is used as an example to describe a process of security protection on the service data: After receiving the service data delivered by the core network, the RC generates a PDCP PDU after implementing a PDCP function on the service data, performs header compression on the PDCP PDU, encrypts the PDCP PDU according to the encryption algorithm and an encryption key, and adds a sequence number to the PDCP PDU. The RC delivers the PDCP PDU to the RAP, and the RAP implements functions that correspond to an RLC layer, a MAC layer, and a PHY layer of the PDCP PDU. For example, the RAP completes segmentation, scheduling, and modulation and coding on the PDCP PDU and performs, according to the generated QoS parameter, service quality control on the service data carried in the DRB.

S612: The RC sends the SRB security information to the RAP.

S613: The RAP performs, according to the SRB security information, security protection on signaling data carried in the SRB.

Specifically, after a security protection function is activated, the RAP performs security protection on the signaling data carried in the SRB; and the security protection is, for example, encryption, decryption, integrity protection, and an integrity check, and the signaling data is, for example, RRC signaling.

Figure 7:
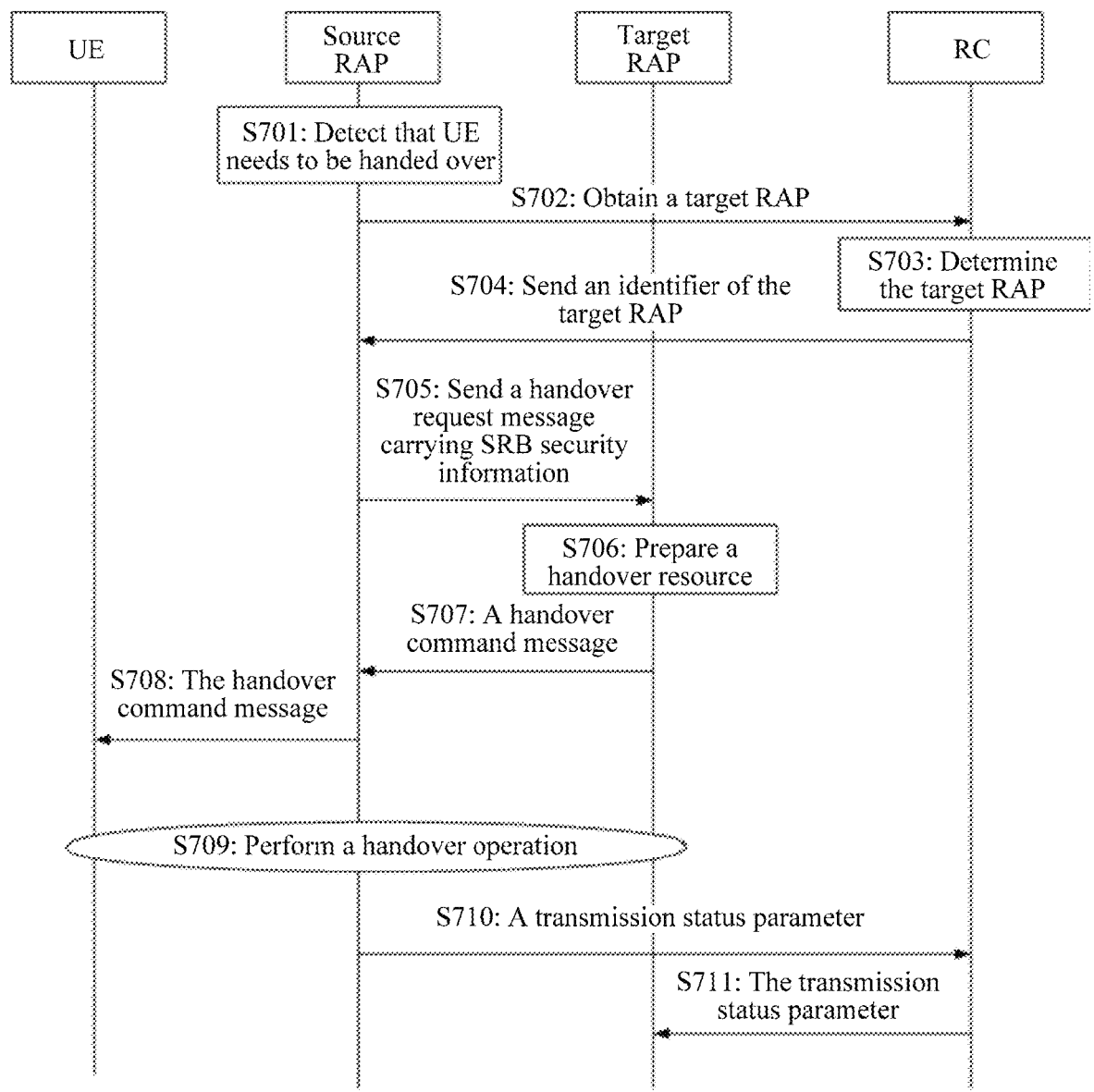
FIG. 7 is a schematic flowchart of a UE handover method according to a first embodiment of the present invention.

Referring to FIG. 7, FIG. 7 is a schematic flowchart of a UE handover method according to a first embodiment of the present invention. In this embodiment of the present invention, the method includes the following steps.

S701: When detecting that UE satisfies a handover condition, a source RAP performs S702.

Specifically, before the UE is handed over, the UE accesses the source RAP. The source RAP determines whether the UE satisfies the handover condition. A determining method may be: the source RAP determines, according to a received signal carrier level of the UE, whether the UE satisfies the handover condition, and if the signal carrier level of the UE is lower than a threshold level, the source RAP determines that the UE satisfies the handover condition; or the source RAP determines, according to a received signal carrier-to-interference ratio of the UE, whether the UE satisfies the handover condition, and if the signal carrierto-interference ratio of the UE is lower than a given value, the source RAP determines that the UE satisfies the handover condition; or the source RAP determines, according to a distance between the source RAP and the UE, whether the UE satisfies the handover condition, and if the distance between the source RAP and the UE is greater than a given value, the source RAP determines that the UE satisfies the handover condition. When determining that the handover condition is satisfied, the source RAP needs to obtain a target RAP to which the UE is to be handed over. The target RAP may be determined by the source RAP, or may be determined by an RC. This is not limited in the present invention.

S702: The source RAP obtains, from an RC, a target RAP to which the UE is to be handed over.

Specifically, the target RAP is selected by the RC. The source RAP sends a request to obtain the target RAP to the corresponding RC. The request is used to request the RC to select the target RAP other than the source RAP from a RAP set of the RC.

S703: The RC determines the target RAP to which the UE is to be handed over.

Specifically, the RC manages the RAP set. The RAP set includes RAP and at least one other RAP. The RC may obtain a link status parameter that is between each RAP in the RAP set and the UE and that is reported by each RAP, and the RC uses a RAP whose link status parameter is optimal as the target RAP to which the UE is to be handed over. The link status parameter includes one or more of an RSSI, RSRP, or RSRQ.

S704: The RC sends an identifier of the target RAP to the RAP.

S705: The source RAP obtains SRB security information of an SRB and sends a handover request message carrying the SRB security information to the target RAP.

Specifically, the source RAP obtains the SRB security information of the SRB between the source RAP and the UE. The security information includes one or more of a security key, an encryption algorithm, a decryption algorithm, an integrity protection algorithm, or an integrity check algorithm. The source RAP determines the target RAP according to the identifier of the target RAP, and sends the handover request message carrying the SRB security information to the target RAP.

S706: The target RAP prepares a handover resource, and after preparing the handover resource, the target RAP returns a handover command message to the source RAP.

Specifically, the handover resource includes a spectrum resource, a hardware resource, and the like. The target RAP receives and stores the SRB security information of the source RAP, so that after the UE is handed over to the target RAP, the target RAP performs security protection on an SRB between the target RAP and the UE by using the SRB security information. DRB security information of a DRB between the RC and the UE remains unchanged, that is, after the UE is handed over to the target RAP, the RC performs security protection on service data in the DRB still by using the original DRB security information.

S707: The target RAP sends the handover command message to the source RAP.

After preparing the handover resource, the target RAP sends the handover command message to the source RAP, so as to notify the source RAP that the handover resource of the target RAP is prepared and that the UE can perform a handover operation.

S708: The source RAP sends the handover command message to the UE.

S709: The UE performs a handover operation. After performing the handover operation, the UE accesses the target RAP.

S710: The source RAP sends a transmission status parameter to the RC.

Specifically, the transmission status parameter may be a PDCP status report and is an uplink transmission status parameter or a downlink transmission status parameter. For a downlink direction, the transmission status parameter indicates a sequence number of a PDCP packet that is successfully or unsuccessfully sent to the UE. By using a sequence number of a PDCP packet that is successfully sent as an example, if a sequence number of a PDCP packet that is successfully sent by a current RAP to the UE is 3, the RC sends the fourth PDCP packet to the target RAP. For an uplink direction, the transmission status parameter indicates a sequence number of a PDCP packet that is successfully or unsuccessfully sent to the RC, and the RC sends the uplink transmission status parameter to the UE, so that the UE sends the PDCP packet to the target RAP according to the sequence number, thereby avoiding repeated data transmission.

S711: The RC sends the transmission status parameter to the target RAP.

Figure 8:
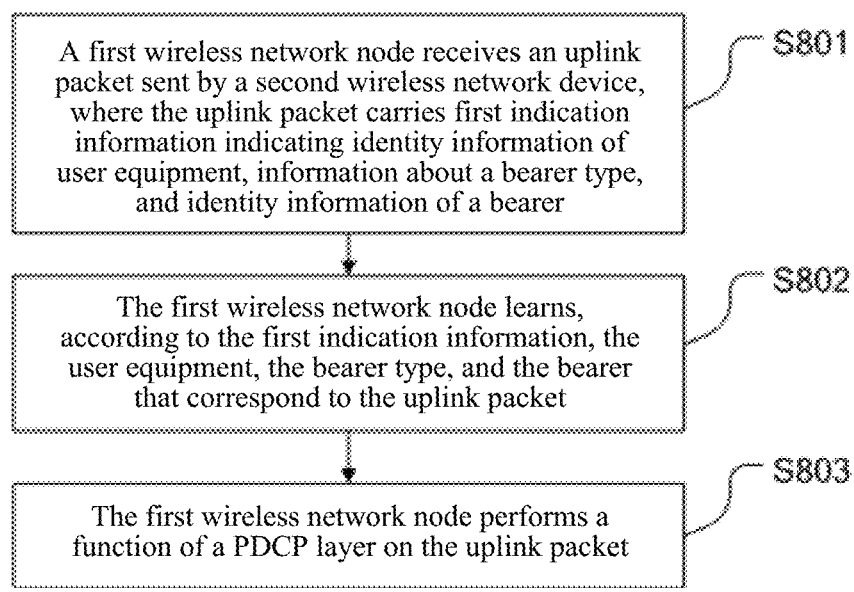
FIG. 8 is a schematic flowchart of a data transmission method according to a fourth embodiment of the present invention.

Referring to FIG. 8, FIG. 8 is a schematic flowchart of a data transmission method according to a fourth embodiment of the present invention. The data transmission method in this embodiment of the present invention is implemented by using the architecture schematic diagram in FIG. 3. The method includes the following steps.

S801: A first wireless network node receives an uplink packet sent by a second wireless network device, where the uplink packet carries first indication information indicating identity information of UE, information about a bearer type, and identity information of a bearer.

Specifically, the second wireless network node receives the uplink packet sent by the UE. The uplink packet carries the identity information of the UE, the information about the bearer type, and the identity information of the bearer. The second wireless network node performs PHY layer processing, MAC layer processing, and RLC layer processing on the uplink packet, and sends the processed uplink packet to the first wireless network node. The processed uplink packet carries the first indication information indicating the identity information of the UE, the information about the bearer type, and the identity information of the bearer.

S802: The first wireless network node learns, according to the first indication information, the user equipment, the bearer type, and the bearer that correspond to the uplink packet.

Specifically, the first wireless network node learns, according to the first indication information carried in the uplink packet, the user equipment, the bearer type, and the bearer that correspond to the uplink packet. The bearer type is an SRB or a DRB. The first indication information may be a GTP tunnel identifier.

S803: The first wireless network node completes PDCP layer processing on the uplink packet.

Specifically, the first wireless network node performs the PDCP layer processing on the uplink packet. The PDCP layer processing includes one or more of header compression, security, or reordering.

Figure 9:
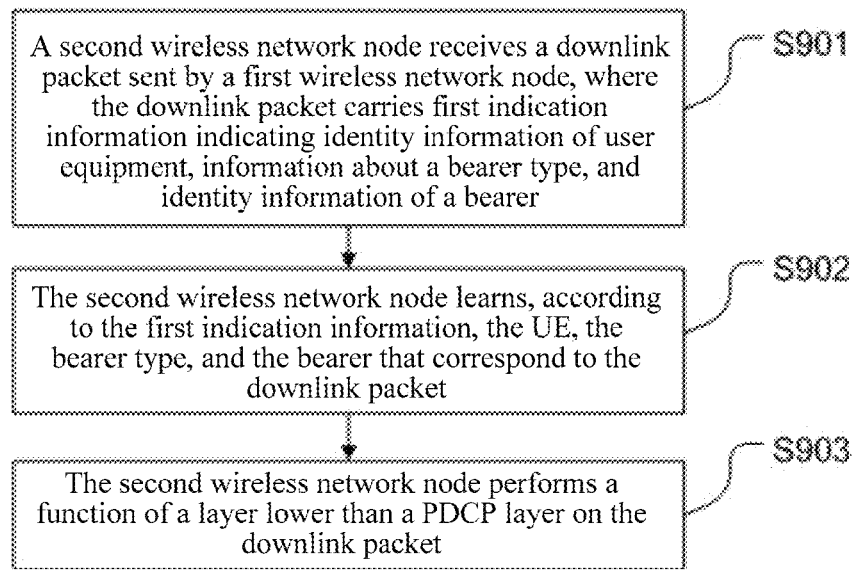
FIG. 9 is a schematic flowchart of a data transmission method according to a fifth embodiment of the present invention.

Referring to FIG. 9, FIG. 9 is a schematic flowchart of a data protection method according to a fifth embodiment of the present invention. In this embodiment of the present invention, the method includes the following steps.

S901: A second wireless network node receives a downlink packet sent by a first wireless network node, where the downlink packet carries first indication information indicating identity information of UE, information about a bearer type, and identity information of a bearer.

Specifically, a core network sends a downlink packet to the first wireless network node. The downlink packet carries identity information of UE, information about a bearer type, and identity information of a bearer. The first wireless network node may learn information about a bearer type of an downlink packet by using an RRC layer. The first wireless network node performs PDCP layer processing on the uplink packet, and sends the processed downlink packet to the second wireless network node. The processed downlink packet carries the first indication information indicating the identity information of the UE, the information about the bearer type, and the identity information of the bearer.

S902: The second wireless network node learns, according to the first indication information, the user equipment, the bearer type, and the bearer that correspond to the downlink packet.

Specifically, the bearer type is an SRB or a DRB. Different UEs correspond to different bearers.

S903: The second wireless network node completes RLC layer processing, MAC layer processing, and PHY layer processing on the downlink packet.

Specifically, the second wireless network node completes the RLC layer processing, the MAC layer processing, and the PHY layer processing on the downlink packet, and sends, according to the identity information of the UE, the processed downlink packet to the corresponding user equipment.

Figure 10A:
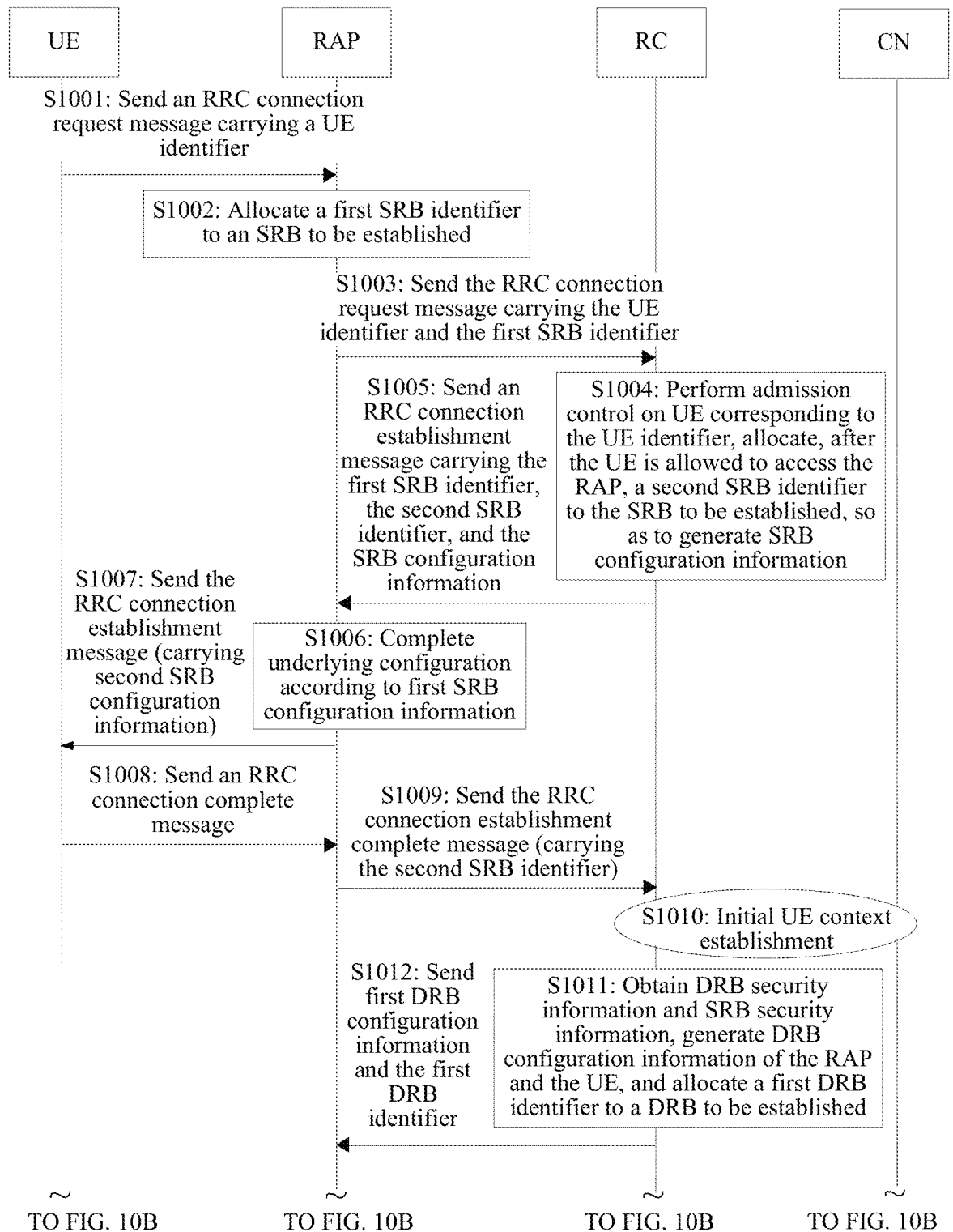
FIG. 10A and FIG. 10B are a schematic flowchart of a data transmission method according to a sixth embodiment of the present invention.
Figure 10B:
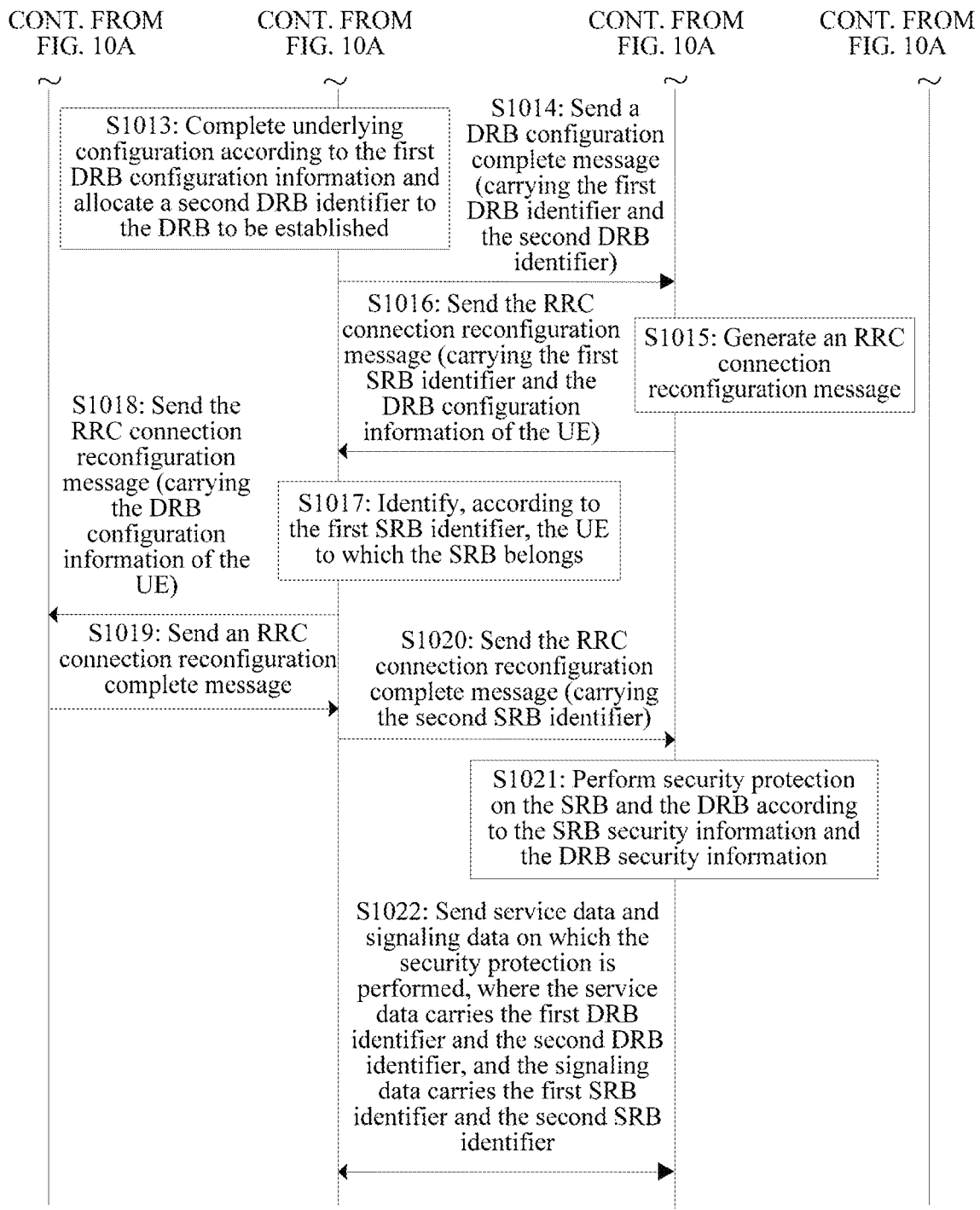

Referring to FIG. 10A and FIG. 10B, FIG. 10A and FIG. 10B are a schematic flowchart of a data transmission method according to a sixth embodiment of the present invention. In this embodiment of the present invention, an RC is a first wireless network node and a RAP is a second wireless network node. The method includes the following steps.

S1001: UE sends an RRC connection establishment request message carrying a UE identifier to the RAP.

Specifically, the UE pre-establishes a default bearer: an SRB 0, and the UE sends the RRC connection request by using the SRB 0. The RRC connection request is used to establish a new SRB for the UE, such as an SRB 1, an SRB 2, or an SRB 3. The UE identifier is used to uniquely identify an identity of the UE. The UE identifier may be an S-TMSI, a C-RNTI, or the like.

S1002: The RAP receives the RRC connection establishment request message and allocates a first SRB identifier to an SRB to be established.

Specifically, the RAP allocates the first SRB identifier to the SRB to be established. The first SRB identifier is used by the RAP to uniquely identify an identity of the SRB to be established (a downlink direction). For example, a GTP tunnel identifier may be added to a signaling message transmitted in the SRB to be established as the first SRB identifier of the SRB to be established. The RAP may determine, in the downlink direction by learning the first SRB identifier, the SRB to be established. The RAP locally stores a mapping relationship between the first SRB identifier and the UE identifier.

S1003: The RAP sends the RRC connection request carrying the UE identifier and the first SRB identifier to the RC.

Specifically, the RAP adds the first SRB identifier and the UE identifier to the RRC connection request, and then sends the RRC connection request to the RC. In this case, the RRC connection request is sent to the RC still by using the default bearer: the SRB 0.

S1004: The RC performs admission control on the UE, and allocates a second SRB identifier after the UE is allowed to access the RAP, so as to generate SRB configuration information.

Specifically, the RC obtains the UE identifier and the first SRB identifier by parsing the received RRC connection request, and performs the admission control on the user equipment corresponding to the UE identifier. An admission control method may be: the RC determines, according to one or more of load status parameters of the RAP and a surrounding RAP, interference status parameters of the RAP and the surrounding RAP, service type information of the UE, or subscription information of the UE, whether the UE has permission to access the RAP. For example, if the RAP is overloaded, and in the subscription information of the UE, an access class of the UE is lower than a preset access class, the RC rejects access of the UE to the RAP; otherwise, the RC allows the UE to access the RAP. After determining that the UE has permission to access the RAP, the RC allocates the second SRB identifier to the SRB to be established. The second SRB identifier is used by the RC to uniquely identify an identity of the SRB to be established (an uplink direction). The RC locally stores a mapping relationship between the first SRB identifier, the second SRB identifier, and the UE identifier. In addition, the RC generates the SRB configuration information. The SRB configuration information includes first SRB configuration information and second SRB configuration information. The first SRB configuration information is used to configure an RLC layer, a MAC layer, and a PHY layer of the RAP. The second SRB configuration information is used by the UE to configure an RRC layer, a PDCP layer, an RLC layer, a MAC layer, and a PHY layer. After the configuration is completed, the UE establishes a new SRB. For example, different identifiers may be added to the SRB configuration information to distinguish between the first SRB configuration information and the second SRB configuration information. The first SRB configuration information is used to be sent to the RAP, and the second SRB configuration information is used to be sent to the UE.

S1005: The RC sends an RRC connection establishment message carrying the first SRB identifier, the second SRB identifier, and the SRB configuration information to the RAP.

S1006: The RAP completes underlying configuration according to first SRB configuration information.

Specifically, the RAP obtains the first SRB identifier, the second SRB identifier, and the SRB configuration information by parsing the received RRC connection establishment message. The RAP learns, according to the first SRB identifier, the SRB to be established by the UE and the first SRB configuration information in the SRB configuration information, and configures the RLC layer, the MAC layer, and the PHY layer according to the first SRB configuration information. The RAP learns the second SRB configuration information in the SRB configuration information, and adds the second SRB configuration information to the RRC connection establishment message. The first SRB configuration information or the second SRB configuration information or both include a third SRB identifier. The third SRB identifier is used to learn signaling data between the UE and the RAP. The RAP stores a relationship between the third SRB identifier and the first SRB identifier/the second SRB identifier.

S1007: The RAP sends the RRC connection establishment message carrying second SRB configuration information to the UE.

Specifically, the UE configures the RRC layer, the PDCP layer, the RLC layer, the MAC layer, and the PHY layer of the UE according to the second SRB configuration information, and establishes a new SRB (for example, the SRB 1). After successfully establishing the SRB 1, the UE returns an RRC connection establishment complete message to the RAP. In this case, the RRC connection establishment complete message is sent by using the new SRB 1, and the RRC connection establishment complete message carries the UE identifier.

S1008: The UE sends an RRC connection establishment complete message carrying the UE identifier to the RAP, where the RRC connection establishment complete message is used to notify the RC that the new SRB is successfully established.

S1009: The RAP sends the RRC connection establishment complete message carrying the second SRB identifier to the RC, where a third SRB identifier indicates an identifier of the second SRB configuration information; the RAP queries the second SRB identifier according to a mapping relationship between the third SRB identifier and the second SRB identifier, and adds the second SRB identifier to the RRC connection establishment complete message; and the RC learns the new SRB of the UE according to the second SRB identifier.

S1010: The RC triggers an initial context establishment procedure to a core network.

Specifically, the RC obtains, from the core network by means of the initial UE context establishment procedure, SRB security information of the newly established SRB, DRB security information of a DRB to be established, and a QoS parameter of the DRB to be established.

S1011: The RC obtains DRB security information, SRB security information, and a QoS parameter of a DRB.

Specifically, the RC obtains the DRB security information of the DRB to be established, the SRB security information of the new SRB, and the QoS parameter of the DRB to be established. In addition, the RC generates DRB configuration information. The DRB configuration information is classified into two types. First DRB configuration information is used to perform underlying configuration on the RAP, and the second DRB configuration information is used to perform DRB establishment configuration on the UE. The first DRB configuration information and second DRB configuration information may be distinguished by using different identifiers. The RC further allocates a first DRB identifier to the DRB to be established. The first DRB identifier is used by the RC to uniquely learn an identity of the DRB of the UE.

S1012: The RC sends first DRB configuration information and a first DRB identifier.

S1013: The RAP learns the first DRB configuration information, and performs DRB configuration on an RLC layer, a MAC layer, and a PHY layer according to the first DRB configuration information; after completing the DRB configuration, the RAP allocates a second DRB identifier to the DRB, where the second DRB identifier is used by the RAP to uniquely learn an identity of the DRB of the UE; and the RAP learns second DRB configuration information in the DRB configuration information. The first DRB configuration information or the second DRB configuration information or both include a third DRB identifier. The third DRB identifier is used to learn a DRB between the UE and the RAP.

S1014: The RAP sends a DRB configuration complete message carrying the first DRB identifier and the second DRB identifier to the RC.

S1015: After receiving the DRB configuration complete message, the RC generates an RRC connection reconfiguration message, where the RRC connection reconfiguration message is used to instruct the UE to establish the DRB.

S1016: The RC sends the RRC connection reconfiguration message carrying the first SRB identifier and the second DRB configuration information to the RAP.

S1017: The RAP learns, according to the first SRB identifier, the UE to which the SRB belongs.

S1018: The RAP sends the RRC connection reconfiguration message carrying the second DRB configuration information to the UE.

S1019: The UE configures the DRB according to the second DRB configuration information, so as to establish the DRB; and after successfully establishing the DRB, the UE returns an RRC connection reconfiguration complete message to the RAP, where the RRC connection reconfiguration complete message carries an identifier of the second SRB configuration information.

S1020: The RAP sends the RRC connection reconfiguration complete message carrying the second SRB identifier to the RC.

S1021: The RC performs security protection on the established SRB and DRB according to the SRB security information and the DRB security information.

S1022: The RC sends service data on which the security protection is performed to the RAP, where the service data carries the first DRB identifier and the second DRB identifier, and signaling data carries the first SRB identifier and the second SRB identifier. In the uplink direction, the RC learns, according to the first DRB identifier carried in the service data, that the service data belongs to the UE; and the RC learns, according to the second SRB identifier carried in the signaling data, that the signaling data belongs to the UE.

Figure 11:
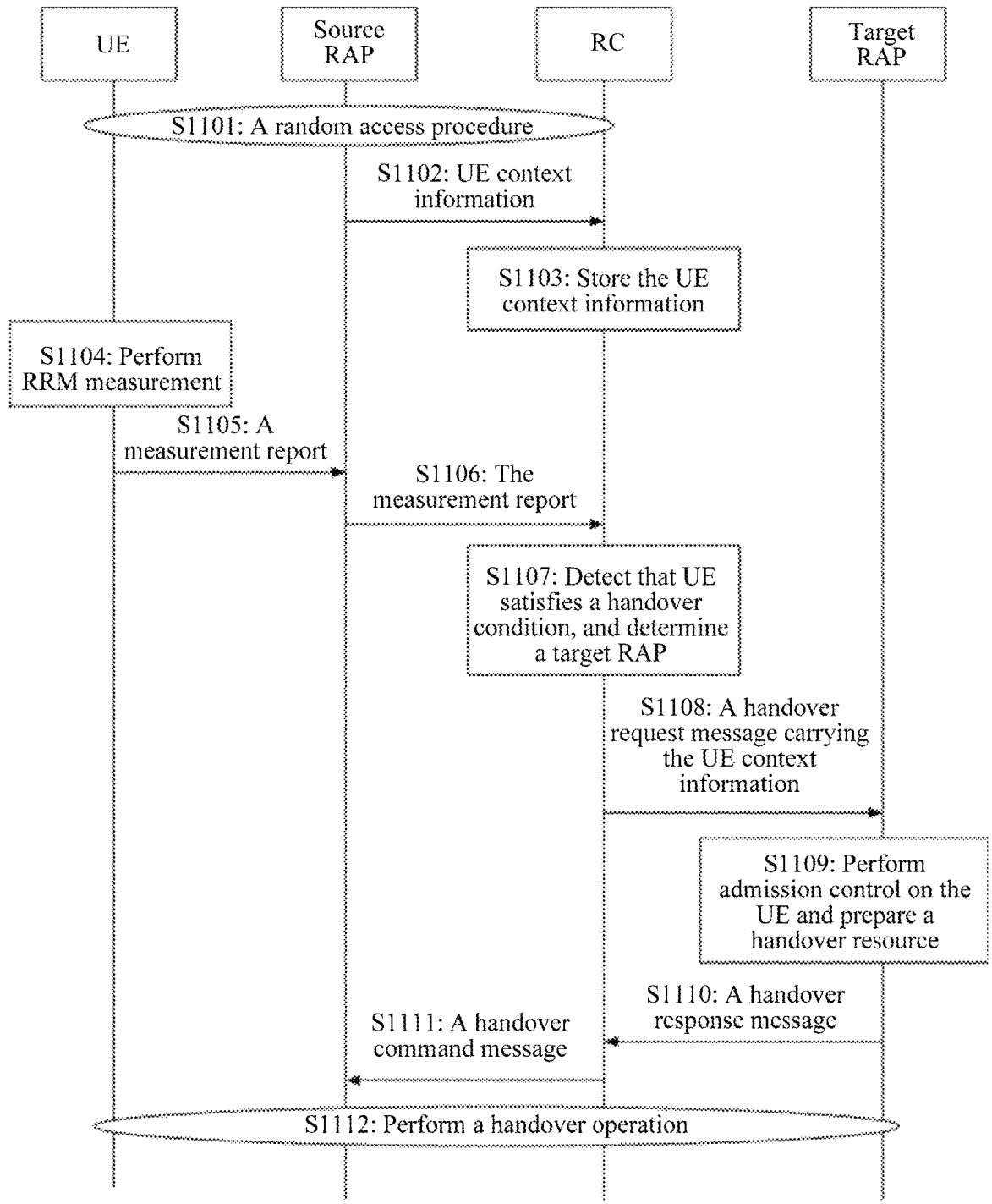
FIG. 11 is a schematic flowchart of a UE handover method according to a second embodiment of the present invention.

Referring to FIG. 11, FIG. 11 is a schematic flowchart of a UE handover method according to a second embodiment of the present invention. In this embodiment of the present invention, the method includes the following steps.

S1101: UE triggers a random access procedure, and the UE establishes a random access channel between a source RAP and an RC.

S1102: The source RAP sends UE context information to the RC, where the UE context information includes a C-RNTI, radio resource configuration information, and the like.

S1103: The RC stores the UE context information.

S1104: The UE performs RRM measurement.

S1105: The UE sends a measurement report that is generated after the RRM measurement is performed to the source RAP.

S1106: The source RAP sends the measurement report to the RC.

S1107: The RC detects, according to the measurement report, whether the UE satisfies a handover condition; and if yes, the RC prepares a handover resource and performs S1108, and the UE determines, according to the measurement report, a target RAP to which the UE is to be handed over.

S1108: The RC sends a handover request message carrying the UE context information to the target RAP.

S1109: The target RAP performs admission control on the UE and determines whether the UE is allowed to access the target RAP, and if the UE is allowed to access the target RAP, performs S1110.

S1110: The target RAP returns a handover response message to the RC.

S1111: The RC sends a handover command message to the source RAP.

S1112: Perform a handover operation. The UE is handed over from the source RAP to the target RAP; and after the handover is successful, the target RAP performs security protection on signaling data by using SRB security information in the UE context information, and performs security protection on service data by using DRB security information.

Figure 12:
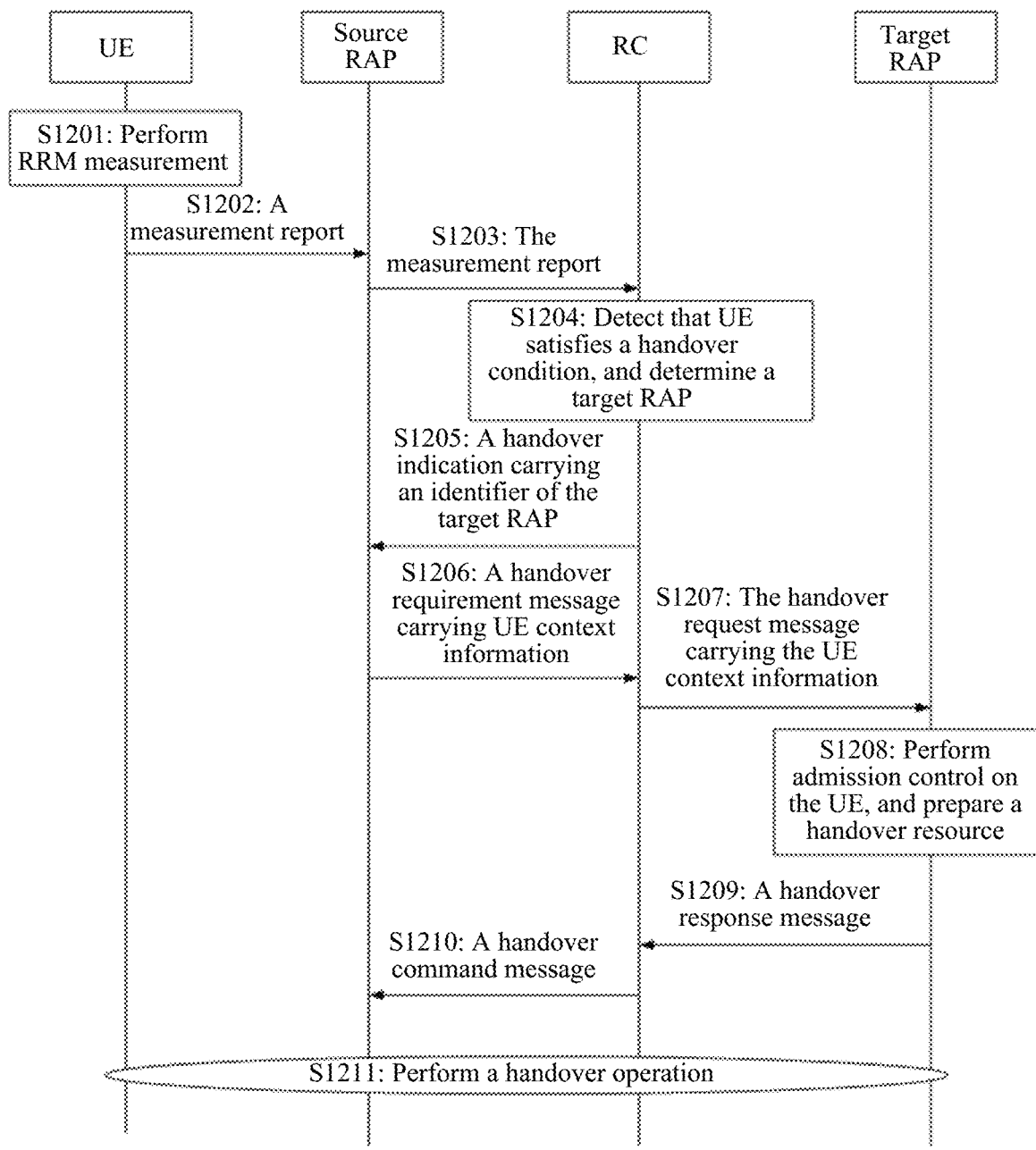
FIG. 12 is a schematic flowchart of a UE handover method according to a third embodiment of the present invention.

Referring to FIG. 12, FIG. 12 is a schematic flowchart of a UE handover method according to a third embodiment of the present invention. In this embodiment of the present invention, the method includes the following steps.

S1201: UE performs RRM measurement.

S1202: The UE sends a measurement report that is generated after the RRM measurement is performed to a source RAP.

S1203: The source RAP forwards the measurement report to an RC.

S1204: The RC detects, according to the measurement report, whether the UE satisfies a handover condition; and if yes, performs S1205, and the RC determines a target RAP to which the UE is to be handed over.

S1205: The RC sends a handover indication carrying an identifier of the target RAP to the source RAP.

S1206: The source RAP returns a handover requirement message carrying the identifier of the target RAP to the RC.

S1207: The RC sends a handover request message carrying UE context information to the target RAP.

S1208: The target RAP performs admission control on the UE, and prepares a handover resource after the UE is allowed to access the target RAP.

S1209: The target RAP sends a handover response message to the RC.

S1210: The RC sends a handover command message to the source RAP.

S1211: Perform a handover operation. The UE is handed over from the source RAP to the target RAP; and after the handover is successful, the target RAP performs security protection on signaling data by using SRB security information in the UE context information, and performs security protection on service data by using DRB security information.

Figure 13:
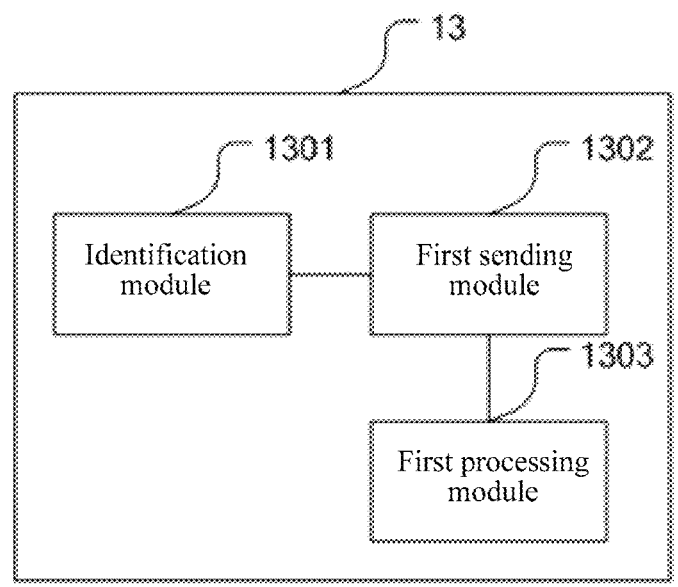
FIG. 13 is a schematic structural diagram of a wireless network node according to a first embodiment of the present invention.

Referring to FIG. 13, FIG. 13 is a schematic structural diagram of a wireless network node according to a first embodiment of the present invention. In this embodiment of the present invention, the wireless network node includes: an identification module 1301, a first sending module 1302, and a first processing module 1303.

The identification module 1301 is configured to learn a bearer type of a downlink packet.

The first sending module 1302 is configured to: when the bearer type is an SRB, send, by the first wireless network node, the downlink packet to a second wireless network node, so that the second wireless network node performs a function of a PDCP layer on the downlink packet.

The first processing module 1303 configured to: when the bearer type is a DRB, perform a function of a PDCP layer on the downlink packet, and send the processed downlink packet to the second wireless network node.

Optionally, the wireless network node in this embodiment of the present invention further includes:

a receiving module, configured to receive an uplink packet sent by the second wireless network node, where the second wireless network node performs a function of a PHY layer, a function of a MAC layer, and a function of an RLC layer on the uplink packet, and a bearer type of the uplink packet is a DRB; and a second processing module, configured to perform the function of the PDCP layer on the uplink packet, and send the processed uplink packet to the core network.

Optionally, the wireless network node in this embodiment of the present invention further includes:

a security information obtaining module, configured to obtain DRB security information and SRB security information from the core network, where the first wireless network node stores the DRB security information, and sends the SRB security information to the second wireless network node, where the first processing module is configured to perform the function of the PDCP layer on the downlink packet according to the DRB security information.

Optionally, the SRB security information and the DRB security information include one or more of an integrity protection algorithm, an integrity check algorithm, an encryption algorithm, a decryption algorithm, or a security key.

Optionally, the wireless network node in this embodiment of the present invention further includes:

an SRB establishment module, configured to: receive a user equipment identifier and a connection request that are sent by the second wireless network node; and when user equipment corresponding to the user equipment identifier has permission to access the second wireless network node, return an admission indication carrying the user equipment identifier to the second wireless network node, where the admission indication is used to instruct the user equipment to establish an SRB between the user equipment and the second wireless network node.

Optionally, the wireless network node in this embodiment of the present invention further includes:

a handover module, configured to: when the UE satisfies a handover condition, determine a target wireless network node, other than the second wireless network node, in a wireless network node set managed by the wireless network node, and send an identifier of the target wireless network node to the second wireless network node; obtain a transmission status parameter of service data from the second wireless network node; and after the UE completes a handover operation, transmit the service data to the UE by using the target wireless network node according to the transmission status parameter.

Optionally, the handover module is configured to: obtain a link quality parameter between each wireless network node in the wireless network node set and the user equipment, and select a wireless network node whose link quality parameter is optimal as the target wireless network node, where the link quality parameter includes one or more of an RSRP, an RSSI, or RSRQ.

This embodiment of the present invention and the first method embodiment are based on a same concept and bring a same technical effect. For a specific process, refer to the description of the first method embodiment, and details are not described herein again.

Figure 14:
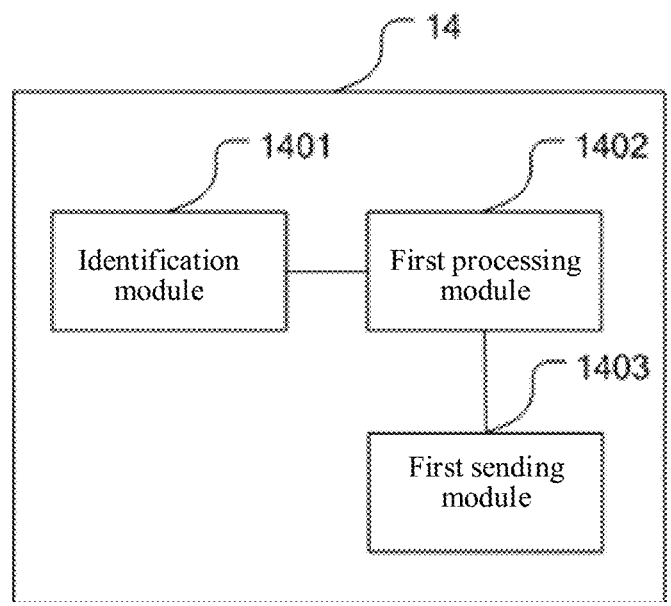
FIG. 14 is a schematic structural diagram of a wireless network node according to a second embodiment of the present invention.

Referring to FIG. 14, FIG. 14 shows a wireless network node according to a second embodiment of the present invention. The wireless network node includes: an identification module 1401, a first processing module 1402, and a first sending module 1403.

The identification module is configured to learn a bearer type of an uplink packet sent by user equipment.

The first processing module is configured to: when the bearer type is an SRB, perform a function of a PHY layer and a function of a layer higher than the PHY layer on the uplink packet.

The first sending module is configured to: when the bearer type is a DRB, perform a function of a PHY layer, a function of a MAC layer, and a function of an RLC layer on the uplink packet, and send the processed uplink packet to a first wireless network node, so that the first wireless network node performs a function of a PDCP layer on the processed uplink packet.

Optionally, the first processing module is configured to: receive SRB security information sent by the first wireless network node, and perform the function of the PDCP layer on the uplink packet according to the SRB security information.

Optionally, the wireless network node in this embodiment of the present invention further includes:

a receiving module, configured to receive a downlink packet sent by the first wireless network node, where a bearer type of the downlink packet is an SRB; and a second processing module, configured to: perform a function of an RRC layer and a function of a layer lower than the RRC layer on the downlink packet, and send the processed downlink packet to the user equipment.

Optionally, the wireless network node in this embodiment of the present invention further includes:

an SRB establishment module, configured to: forward, to the first wireless network node, a connection request that carries a user equipment identifier and that is sent by the user equipment; receive an admission indication that is generated after the first wireless network node determines that the user equipment has access permission, where the admission indication carries the user equipment identifier; generate a connection establishment message according to the admission indication, and send the connection establishment message to the user equipment, so that the user equipment establishes an SRB according to the connection establishment message, and returns a connection establishment complete message to the second wireless network node after successfully establishing the SRB; and send the received connection establishment complete message to the first wireless network node.

Optionally, the wireless network node in this embodiment of the present invention further includes:

a handover module, configured to: determine, when the user equipment satisfies a handover condition, a target wireless network node to which the user equipment is to be handed over; send a handover request message carrying the SRB security information to the target wireless network node, so that after preparing a handover resource, the target wireless network node returns a handover command message to the second wireless network node; and forward the handover command message to the user equipment, where the handover command message carries the SRB security information, so that after completing a handover operation, the user equipment returns a handover complete message to the target wireless network node, and after receiving the handover complete message, the target wireless network access node performs security protection on signaling data according to the SRB security information.

Optionally, the handover module is configured to:

when a signal carrier level of the user equipment is less than a first threshold, determine that the user equipment satisfies the handover condition; or when a signal carrier-to-interference ratio of the user equipment is less than a second threshold, determine that the user equipment satisfies the handover condition; or when a distance between the wireless network node and the user equipment is greater than a third threshold, determine that the user equipment satisfies the handover condition; and receive a handover indication that carries an identity of the target wireless network node and that is sent by the first wireless network node, and determine the target wireless network node according to the identity.

This embodiment of the present invention and the second method embodiment are based on a same concept and bring a same technical effect. For a specific process, refer to the description of the second method embodiment, and details are not described herein again.

Figure 15:
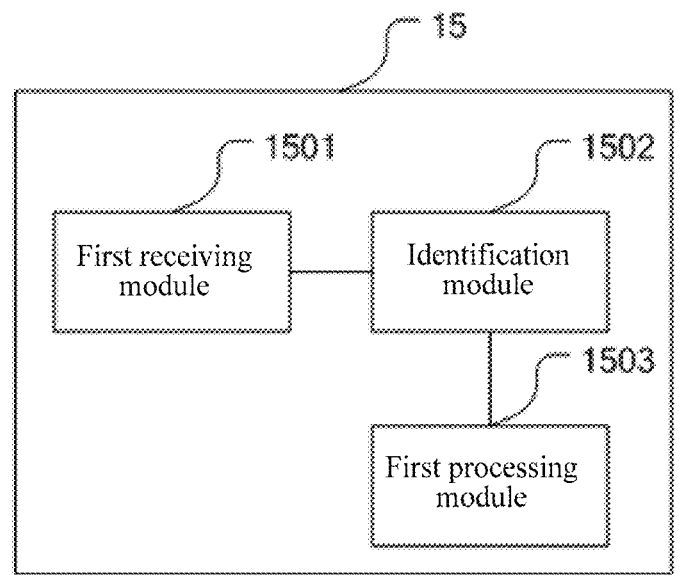
FIG. 15 is a schematic structural diagram of a wireless network node according to a third embodiment of the present invention.

Referring to FIG. 15, FIG. 15 shows a wireless network node according to a third embodiment of the present invention. The wireless network node includes: a first receiving module 1501, an identification module 1502, and a first processing module 1503.

The first receiving module 1501 is configured to receive an uplink packet sent by a second wireless network device, where the uplink packet carries first indication information indicating identity information of user equipment, information about a bearer type, and identity information of a bearer.

The identification module 1502 is configured to learn, according to the first indication information, the user equipment, the bearer type, and the bearer that correspond to the uplink packet.

The first processing module 1503 is configured to perform a function of a PDCP layer on the uplink packet.

Optionally, the first processing module is configured to: learn the bearer type of the uplink packet; and when the bearer type of the uplink packet is a DRB, perform the function of the PDCP layer on the second packet according to DRB security information and send the processed uplink packet to a core network; or when the bearer type of the uplink packet is an SRB, perform the function of the PDCP layer and a function of an RRC layer on the second packet according to SRB security information.

Optionally, the wireless network node in this embodiment of the present invention further includes:

a second receiving module, configured to receive a downlink packet sent by the core network, where the downlink packet carries second indication information indicating identity information of user equipment, information about a bearer type, and identity information of a bearer; and a second processing module, configured to: implement the function of the RRC layer and the function of the PDCP layer on the packet, and send the processed downlink packet to the second wireless network node, so that the second wireless network node learns the user equipment, the bearer type, and the bearer of the downlink packet according to the second indication information.

Optionally, the wireless network node in this embodiment of the present invention further includes:

a first handover module, configured to: determine, when the user equipment satisfies a handover condition, a target wireless network node to which the user equipment is to be handed over, and obtain UE context information of the second wireless network node;

send a handover request message carrying the UE context information to the target wireless network node, so that after determining that the user equipment has access permission and preparing a handover resource, the target wireless network node returns a handover response message to the first wireless network node; and receive the handover response message returned by the target wireless network node, and forward the handover response message to the second wireless network node, so that the second wireless network node sends a handover command message to the user equipment according to the handover response message, where the handover command message is used to instruct the user equipment to complete a handover operation.

Optionally, the wireless network node in this embodiment of the present invention further includes:

a second handover module, configured to: when the UE satisfies a handover condition, determine a target wireless network node to which the user equipment is to be handed over;

send a handover indication message carrying an identifier of the target wireless network node to the second wireless network node, where the handover indication message is used to instruct the wireless network node to obtain UE context information of the user equipment and send a handover requirement message carrying the UE context information to the first wireless network node;

send a handover request message to the target wireless network node according to the handover requirement message, so that after determining that the user equipment has access permission, the target wireless network node returns a handover response message to the first wireless network node; and after receiving the handover response message returned by the target wireless network node, send the handover response message to the second wireless network node, so that the wireless network node sends a handover command message to the user equipment according to the handover response message, where the handover command message is used to instruct the user equipment to complete a handover operation.

This embodiment of the present invention and the fifth method embodiment are based on a same concept and bring a same technical effect. For a specific process, refer to the description of the fifth method embodiment, and details are not described herein again.

Figure 16:
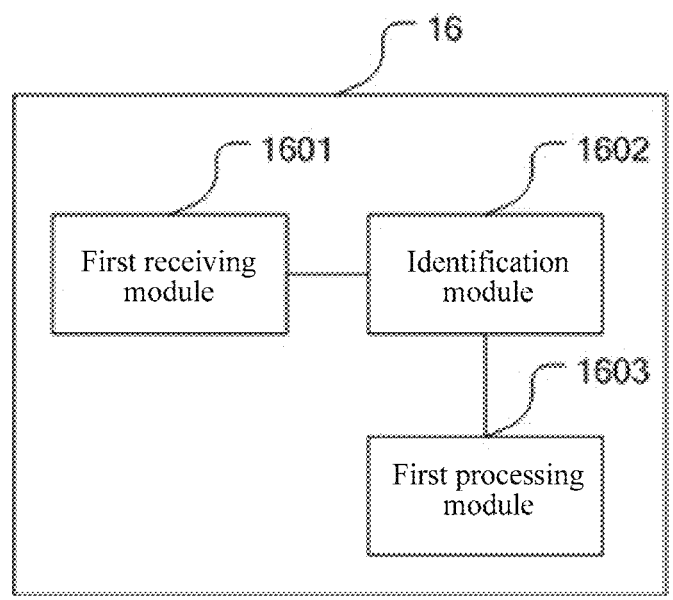
FIG. 16 is a schematic structural diagram of a wireless network node according to a fourth embodiment of the present invention.

Referring to FIG. 16, FIG. 16 is a schematic structural diagram of a wireless network node according to a fourth embodiment of the present invention. In this embodiment of the present invention, the wireless network node includes: a first receiving module 1601, an identification module 1602, and a first processing module 1603.

The first receiving module 1601 is configured to receive a downlink packet sent by the first wireless network node, where the downlink packet carries first indication information indicating identity information of user equipment, information about a bearer type, and identity information of a bearer.

The identification module 1602 is configured to learn, according to the first indication information, the user equipment, the bearer type, and the bearer that correspond to the downlink packet.

The first processing module 1603 is configured to perform a function of a layer lower than a PDCP layer on the downlink packet.

Optionally, the wireless network node in this embodiment of the present invention further includes:

a second receiving module, configured to receive an uplink packet sent by user equipment, where the uplink packet carries second indication information indicating identity information of the user equipment, information about a bearer type, and identity information of a bearer; and a second processing module, configured to perform the function of the layer lower than the PDCP layer on the uplink packet and send the processed uplink packet to the first wireless network node, so that the first wireless network node performs a function of a PDCP layer on the processed uplink packet.

Optionally, the wireless network node in this embodiment of the present invention further includes:

a handover module, configured to: forward, to the first wireless network node, a measurement report sent by the user equipment, so that when the first wireless network node detects, according to the measurement report, that the user equipment satisfies a handover condition, the first wireless network node determines a target wireless network node to which the user equipment is to be handed over, and the first wireless network node returns a handover indication carrying an identity of the target wireless network node to the second wireless network node; and after receiving the handover indication carrying the identity of the target wireless network node, obtain UE context information of the user equipment, and send a handover requirement message carrying the UE context information to the first wireless network node.

This embodiment of the present invention and the sixth method embodiment are based on a same concept and bring a same technical effect. For a specific process, refer to the description of the sixth method embodiment, and details are not described herein again.

Figure 17:
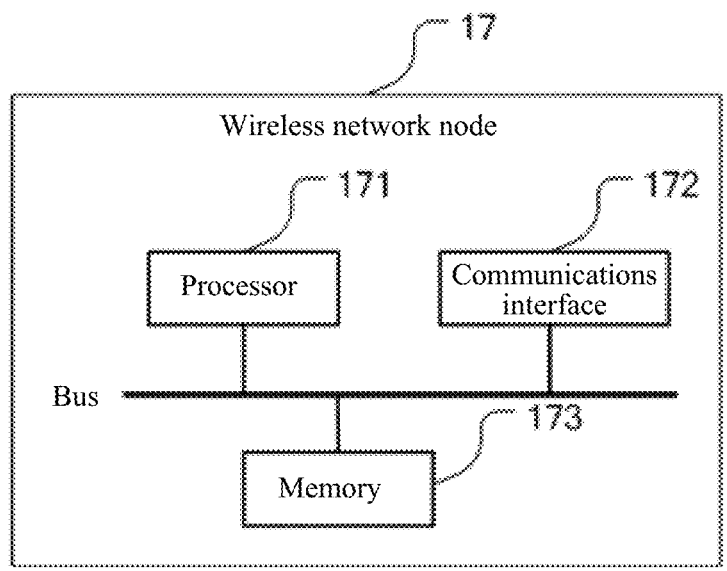
FIG. 17 is a schematic structural diagram of a wireless network node according to a fifth embodiment of the present invention.

Referring to FIG. 17, a fifth embodiment of the present invention further provides a wireless network node. In this embodiment of the present invention, the wireless network node includes a processor 171, a memory 173, and a communications interface 172. The communications interface 172 is configured to communicate with an external device. There may be one or more processors in the wireless network node 17. In some embodiments of the present invention, the processor 171, the memory 173, and the communications interface 172 may be connected to each other by using a bus or in another manner. The wireless network node may be configured to perform the method shown in FIG. 4. For meanings of the terms and examples used in this embodiment, refer to the embodiment corresponding to FIG. 4, and details are not described herein again.

The memory 173 stores program code. The processor 171 is configured to invoke the program code stored in the memory 173, to perform the following operations:

learning a bearer type of a downlink packet; and when the bearer type is a signaling radio bearer SRB, sending the downlink packet to a second wireless network node, so that the second wireless network node performs a function of a Packet Data Convergence Protocol PDCP layer on the downlink packet; or when the bearer type is a data radio bearer DRB, performing a function of a PDCP layer on the downlink packet, and sending the processed downlink packet to the second wireless network node.

In some embodiments of the present invention, the processor is further configured to:

receive an uplink packet sent by the second wireless network node, where the second wireless network node performs a function of a physical PHY layer, a function of a Media Access Control MAC layer, and a function of a logical link control RLC layer on the uplink packet, and a bearer type of the uplink packet is a DRB; and perform the function of the PDCP layer on the uplink packet, and send the processed uplink packet to the core network.

In some embodiments of the present invention, the processor is further configured to:

obtain DRB security information and SRB security information from the core network;

and store the DRB security information, and send the SRB security information to the second wireless network node, where the performing a function of a PDCP layer on the downlink packet includes:

performing the function of the PDCP layer on the downlink packet according to the DRB security information.

In some embodiments of the present invention, the SRB security information and the DRB security information include one or more of an integrity protection algorithm, an integrity check algorithm, an encryption algorithm, a decryption algorithm, or a security key.

In some embodiments of the present invention, before learning the bearer type of the downlink packet, the processor is further configured to:

receive a user equipment identifier and a connection request that are sent by the second wireless network node; and when user equipment corresponding to the user equipment identifier has permission to access the second wireless network node, return an admission indication carrying the user equipment identifier to the second wireless network node, where the admission indication is used to instruct the user equipment to establish an SRB between the user equipment and the second wireless network node.

In some embodiments of the present invention, the processor is further configured to:

when the user equipment satisfies a handover condition, determine a target wireless network node, other than the second wireless network node, in a wireless network node set managed by the wireless network node, and send an identifier of the target wireless network node to the second wireless network node;

obtain a transmission status parameter of service data from the second wireless network node; and after the user equipment completes a handover operation, transmit the service data to the user equipment by using the target wireless network node according to the transmission status parameter.

In some embodiments of the present invention, the determining, by the processor, a target wireless network, node other than the second wireless network node, in a wireless network node set managed by the first wireless network node includes:

obtaining a link quality parameter between each wireless network node in the wireless network node set and the user equipment, and selecting a wireless network node whose link quality parameter is optimal as the target wireless network node, where the link quality parameter includes one or more of a reference signal received power RSRP, a received signal strength indicator RSSI, or reference signal received quality RSRQ.

Figure 18:
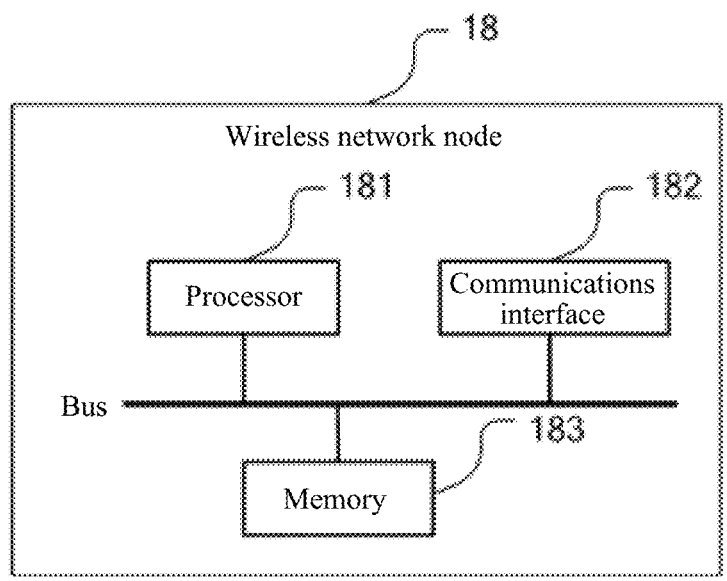
FIG. 18 is a schematic structural diagram of a wireless network node according to a sixth embodiment of the present invention.

Referring to FIG. 18, a sixth embodiment of the present invention further provides a wireless network node. In this embodiment of the present invention, the wireless network node includes a processor 181, a memory 183, and a communications interface 182. The communications interface 182 is configured to communicate with an external device. There may be one or more processors in the wireless network node 18. In some embodiments of the present invention, the processor 181, the memory 183, and the communications interface 182 may be connected to each other by using a bus or in another manner. The wireless network node may be configured to perform the method shown in FIG. 5. For meanings of the terms and examples used in this embodiment, refer to the embodiment corresponding to FIG. 5, and details are not described herein again.

The memory 183 stores program code. The processor 181 is configured to invoke the program code stored in the memory 183, to perform the following operations:

learning a bearer type of an uplink packet sent by user equipment; and when the bearer type is an SRB, performing a function of a PHY layer and a function of a layer higher than the PHY layer on the uplink packet; or when the bearer type is a DRB, performing a function of a PHY layer, a function of a MAC layer, and a function of an RLC layer on the uplink packet, and sending the processed uplink packet to a first wireless network node, so that the first wireless network node performs a function of a PDCP layer on the processed uplink packet.

In some embodiments of the present invention, the performing, by the processor, a function of a PHY layer and a function of a layer higher than the PHY layer on the uplink packet includes:

receiving SRB security information sent by the first wireless network node, and performing the function of the PDCP layer on the uplink packet according to the SRB security information.

In some embodiments of the present invention, the processor is further configured to:

receive a downlink packet sent by the first wireless network node, where a bearer type of the downlink packet is an SRB; and perform a function of an RRC layer and a function of a layer lower than the RRC layer on the downlink packet, and send the processed downlink packet to the user equipment.

In some embodiments of the present invention, the processor is further configured to:

forward, to the first wireless network node, a connection request that carries a user equipment identifier and that is sent by the user equipment;

receive an admission indication that is generated after the first wireless network node determines that the user equipment has access permission, where the admission indication carries the user equipment identifier;

generate a connection establishment message according to the admission indication, and send the connection establishment message to the user equipment, so that the user equipment establishes an SRB according to the connection establishment message, and returns a connection establishment complete message to after successfully establishing the SRB; and send the received connection establishment complete message to the first wireless network node.

In some embodiments of the present invention, the processor is further configured to:

determine, when the user equipment satisfies a handover condition, a target wireless network node to which the user equipment is to be handed over;

send a handover request message carrying the SRB security information to the target wireless network node, so that after preparing a handover resource, the target wireless network node returns a handover command message to; and forward the handover command message to the user equipment, where the handover command message carries the SRB security information, so that after completing a handover operation, the user equipment returns a handover complete message to the target wireless network node, and after receiving the handover complete message, the target wireless network access node performs security protection on signaling data according to the SRB security information.

In some embodiments of the present invention, the determining, by the processor when the user equipment satisfies a handover condition, a target wireless network node to which the user equipment is to be handed over includes:

when a signal carrier level of the user equipment is less than a first threshold, determining that the user equipment satisfies the handover condition; or when a signal carrier-to-interference ratio of the user equipment is less than a second threshold, determining that the user equipment satisfies the handover condition; or when a distance between the second wireless network node and the user equipment is greater than a third threshold, determining that the user equipment satisfies the handover condition; and receiving a handover indication that carries an identity of the target wireless network node and that is sent by the first wireless network node, and determining the target wireless network node according to the identity.

Figure 19:
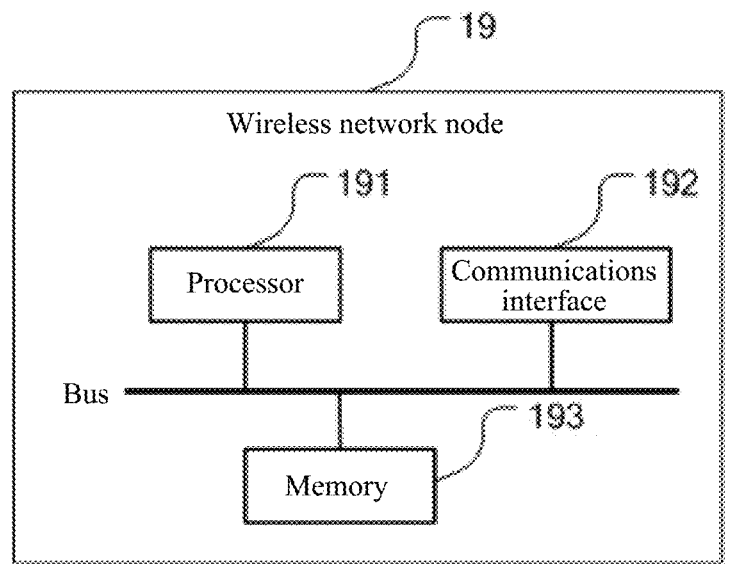
FIG. 19 is a schematic structural diagram of a wireless network node according to a seventh embodiment of the present invention.

Referring to FIG. 19, a seventh embodiment of the present invention further provides a wireless network node. In this embodiment of the present invention, the wireless network node includes a processor 191, a memory 193, and a communications interface 192. The communications interface 192 is configured to communicate with an external device. There may be one or more processors in the wireless network node 19. In some embodiments of the present invention, the processor 191, the memory 193, and the communications interface may be connected to each other by using a bus or in another manner. The wireless network node may be configured to perform the method shown in FIG. 8. For meanings of the terms and examples used in this embodiment, refer to the embodiment corresponding to FIG. 8, and details are not described herein again.

The memory 193 stores program code. The processor 191 is configured to invoke the program code stored in the memory 193, to perform the following operations:

receiving an uplink packet sent by a second wireless network device, where the uplink packet carries first indication information indicating identity information of user equipment, information about a bearer type, and identity information of a bearer;

learning, according to the first indication information, the user equipment, the bearer type, and the bearer that correspond to the uplink packet; and performing a function of a PDCP layer on the uplink packet.

In some embodiments of the present invention, the implementing, by the processor, a function of a PDCP layer on the uplink packet includes:

learning the bearer type of the uplink packet; and when the bearer type of the uplink packet is a DRB, performing the function of the PDCP layer on the second packet according to DRB security information and sending the processed uplink packet to a core network; or when the bearer type of the uplink packet is an SRB, performing the function of the PDCP layer and a function of an RRC layer on the second packet according to SRB security information.

In some embodiments of the present invention, the processor is further configured to:

receive a downlink packet sent by the core network, where the downlink packet carries second indication information indicating identity information of user equipment, information about a bearer type, and identity information of a bearer; and implement, by the first wireless network node, the function of the RRC layer and the function of the PDCP layer on the packet, and send the processed downlink packet to the second wireless network node, so that the second wireless network node learns the user equipment, the bearer type, and the bearer of the downlink packet according to the second indication information.

In some embodiments of the present invention, the processor is further configured to:

determine, when the user equipment satisfies a handover condition, a target wireless network node to which the user equipment is to be handed over, and obtain UE context information of the second wireless network node;

send a handover request message carrying the UE context information to the target wireless network node, so that after determining that the user equipment has access permission and preparing a handover resource, the target wireless network node returns a handover response message to; and receive the handover response message returned by the target wireless network node, and forward the handover response message to the second wireless network node, so that the second wireless network node sends a handover command message to the user equipment according to the handover response message, where the handover command message is used to instruct the user equipment to complete a handover operation.

In some embodiments of the present invention, the processor is further configured to:

determine, when the user equipment satisfies a handover condition, a target wireless network node to which the user equipment is to be handed over;

send a handover indication message carrying an identifier of the target wireless network node to the second wireless network node, where the handover indication message is used to instruct the wireless network node to obtain UE context information of the user equipment and send a handover requirement message carrying the UE context information to;

send a handover request message to the target wireless network node according to the handover requirement message, so that after determining that the user equipment has access permission, the target wireless network node returns a handover response message to; and after receiving the handover response message returned by the target wireless network node, send the handover response message to the second wireless network node, so that the wireless network node sends a handover command message to the user equipment according to the handover response message, where the handover command message is used to instruct the user equipment to complete a handover operation.

Figure 20:
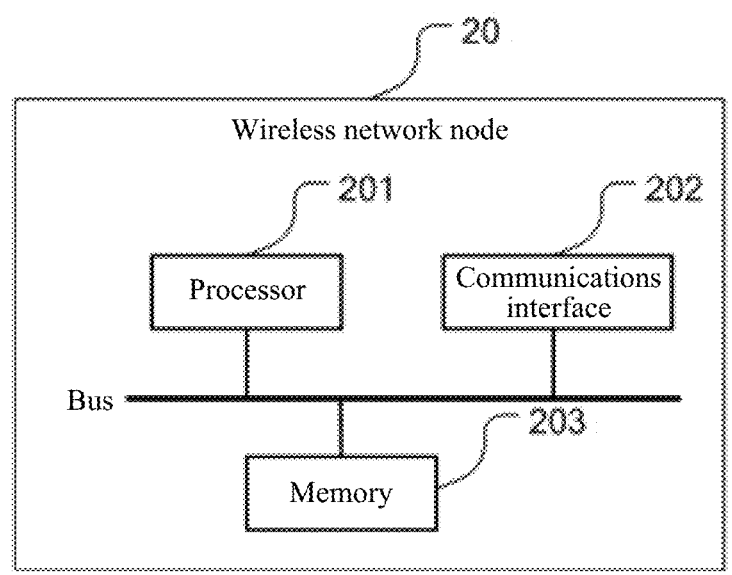
FIG. 20 is a schematic structural diagram of a wireless network node according to an eighth embodiment of the present invention.

Referring to FIG. 20, an eighth embodiment of the present invention further provides a wireless network node. In this embodiment of the present invention, the wireless network node 20 includes a processor 201, a memory 203, and a communications interface 202. The communications interface 202 is configured to communicate with an external device. There may be one or more processors in the wireless network node 20. In some embodiments of the present invention, the processor 201, the memory 203, and the communications interface 202 may be connected to each other by using a bus or in another manner. The wireless network node may be configured to perform the method shown in FIG. 9. For meanings of the terms and examples used in this embodiment, refer to the embodiment corresponding to FIG. 9, and details are not described herein again.

The memory 203 stores program code. The processor 201 is configured to invoke the program code stored in the memory 203, to perform the following operations:

receiving a downlink packet sent by the first wireless network node, where the downlink packet carries first indication information indicating identity information of user equipment, information about a bearer type, and identity information of a bearer;

learning, according to the first indication information, the user equipment, the bearer type, and the bearer that correspond to the downlink packet; and performing a function of a layer lower than a PDCP layer on the downlink packet.

In some embodiments of the present invention, the processor is further configured to:

receive an uplink packet sent by user equipment, where the uplink packet carries second indication information indicating identity information of the user equipment, information about a bearer type, and identity information of a bearer; and perform the function of the layer lower than the PDCP layer on the uplink packet, and send the processed uplink packet to the first wireless network node, so that the first wireless network node performs a function of a PDCP layer on the processed uplink packet.

In some embodiments of the present invention, the processor is further configured to:

forward, to the first wireless network node, a measurement report sent by the user equipment, so that when the first wireless network node detects, according to the measurement report, whether the user equipment satisfies a handover condition, the first wireless network node determines a target wireless network node to which the user equipment is to be handed over, and the first wireless network node returns a handover indication carrying an identity of the target wireless network node to the second wireless network node; and after receiving the handover indication carrying the identity of the target wireless network node, obtain UE context information of the user equipment and send a handover requirement message carrying the UE context information to the first wireless network node.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

What are disclosed above are merely examples of embodiments of the present invention, and certainly are not intended to limit the protection scope of the present invention. A person of ordinary skill in the art may understand that all or some of processes that implement the foregoing embodiments and equivalent modifications made in accordance with the claims of the present invention shall fall within the scope of the present invention.

What is claimed is:

1. A data transmission method, comprising:
receiving, by a first wireless network node, an uplink packet from a second wireless network node, wherein the uplink packet carries a GPRS Tunneling protocol (GTP) tunnel identifier indicating an identity of user equipment, information about a bearer type, and identity of a bearer;
identifying, by the first wireless network node according to the GTP tunnel identifier, the user equipment, the bearer type, and the bearer that correspond to the uplink packet; and
performing, by the first wireless network node, a function of a packet data convergence protocol layer on the uplink packet; and wherein
the first wireless network node and the second wireless network node are included in a single base station;
the first wireless network node has a radio resource control layer and the packet data convergence protocol layer; and
the second wireless network node has a radio link control layer, a media access control layer, and a physical layer.

2. The method according to claim 1, wherein the function of the packet data convergence protocol layer comprises one or more of header compression, security, and reordering, and the method further comprising:
performing, by the second wireless network node, a function of the radio link control layer that comprises one or more of segmentation, cascading, and automatic repeat request;
performing, by the second wireless network node, a function of the media access control layer that comprises one or more of scheduling, logical channel priority processing and hybrid automatic repeat request; and
performing, by the second wireless network node, a function of the physical layer that comprises one or more of modulation, demodulation, encoding, and multi-antenna mapping.

3. The method according to claim 1, wherein the bearer type is a signaling radio bearer (SRB) or a data radio bearer (DRB).

4. A base station, comprising:
a first wireless network node; and a second wireless network node;
wherein the first wireless network node has a radio resource control layer and a packet data convergence protocol layer; and
wherein the second wireless network node has a radio link control layer, a media access control layer, and a physical layer; and wherein
the second wireless network node is configured to send an uplink packet to the first wireless network node, wherein the uplink packet carries a GPRS Tunneling protocol (GTP) tunnel identifier indicating an identity of user equipment, information about a bearer type, and an identity of a bearer;
the first wireless network node is configured to identify, according to the GTP tunnel identifier, the user equipment, the bearer type, and the bearer that correspond to the uplink packet; and
the first wireless network node is further configured to perform a function of the packet data convergence protocol layer on the uplink packet.

5. The base station according to claim 4, wherein the function of the packet data convergence protocol layer comprises one or more of header compression, security, and reordering; and wherein the second wireless network node is configured to perform:
- a function of the radio link control layer that comprises one or more of segmentation, cascading, and automatic repeat request;
- a function of the media access control layer that comprises one or more of scheduling, logical channel priority processing and hybrid automatic repeat request; and
- a function of the physical layer that comprises one or more of modulation, demodulation, encoding, and multi-antenna mapping.

6. The base station according to claim 4, wherein the bearer type is a signaling radio bearer (SRB) or a data radio bearer (DRB).

7. A non-transitory computer-readable medium storing instructions that, when executed by a base station, cause the base station to perform operations comprising:
- receiving, by a first wireless network node of the base station, an uplink packet from a second wireless network node, wherein the uplink packet carries a GPRS Tunneling protocol (GTP tunnel identifier) indicating an identity of user equipment, information about a bearer type, and an identity of a bearer;
- identifying, by the first wireless network node of the base station according to the GTP tunnel identifier, the user equipment, the bearer type, and the bearer that correspond to the uplink packet; and
- performing, by the first wireless network node of the base station, a function of a packet data convergence protocol layer on the uplink packet; and wherein
- the first wireless network node and the second wireless network node are included in a single base station;
- the first wireless network node has a radio resource control layer and the packet data convergence protocol layer; and
- the second wireless network node has a radio link control layer, a media access control layer, and a physical layer.

8. The non-transitory computer-readable medium according to claim 7, wherein the bearer type is a signaling radio bearer (SRB) or a data radio bearer (DRB).

* * * * *